(12) United States Patent
Tanimoto et al.

(10) Patent No.: US 6,426,767 B1
(45) Date of Patent: Jul. 30, 2002

(54) IMAGE FORMING APPARATUS FOR MAINTAINING A CONSTANT BEAM SCANNING STATE

(75) Inventors: Koji Tanimoto; Kenichi Komiya, both of Kawasaki; Jun Sakakibara, Tokyo-To; Koji Kawai, Fujisawa, all of (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/750,292

(22) Filed: Dec. 29, 2000

(51) Int. Cl.[7] .................. G03G 15/01; G02B 27/10
(52) U.S. Cl. .................. 347/115; 347/232; 347/233
(58) Field of Search .................. 347/115, 116, 347/118, 119, 232, 234, 241, 233; 359/204

(56) References Cited

U.S. PATENT DOCUMENTS

| | | | |
|---|---|---|---|
| 5,768,671 A | | 6/1998 | Komiya et al. |
| 5,778,280 A | | 7/1998 | Komiya et al. |
| 5,854,958 A | | 12/1998 | Tanimoto et al. |
| 5,892,533 A | * | 4/1999 | Tanimoto et al. ........... 347/257 |
| 5,929,891 A | | 7/1999 | Komiya et al. |
| 5,982,402 A | * | 11/1999 | Yoshikawa et al. ......... 347/116 |
| 5,995,246 A | | 11/1999 | Komiya et al. |

FOREIGN PATENT DOCUMENTS

| | | | |
|---|---|---|---|
| JP | 08-278680 A | | 10/1996 |
| JP | 09-258125 A | | 10/1997 |
| JP | 09-314901 A | | 12/1997 |
| JP | 10-076704 A | | 3/1998 |
| JP | 10-142535 A | | 5/1998 |
| JP | 10-307443 | * | 11/1998 |
| JP | 10-307443 A | | 11/1998 |
| JP | 11-084280 A | | 3/1999 |
| JP | 11-095142 A | | 4/1999 |
| JP | 11-202229 A | | 7/1999 |

* cited by examiner

*Primary Examiner*—Joan Pendegrass
(74) *Attorney, Agent, or Firm*—Foley & Lardner

(57) ABSTRACT

An image forming apparatus maintains a constant beam scanning state so that light beams scan each drum always in the same state once a desired color overlapping accuracy is obtained by controlling color registration in color image formation. This mechanism achieves constantly fine color overlapping without forming a test pattern several times or consuming toner unnecessarily. A beam passage switch is provided in a laser scanning system. Sensors provided near each photosensitive drum determine whether each light beam has scanned a certain portion with no inclination or a certain scanning area, or whether each image magnification provides a desired size. Sensors for detecting scanning light beam obtains the center of light beam in accordance with information on a point at which the sensors start to respond and another point at which they cease responding, for performing several types of control based on the positional information, which provides correct information even though the size or power is different over sevral light beam.

4 Claims, 18 Drawing Sheets

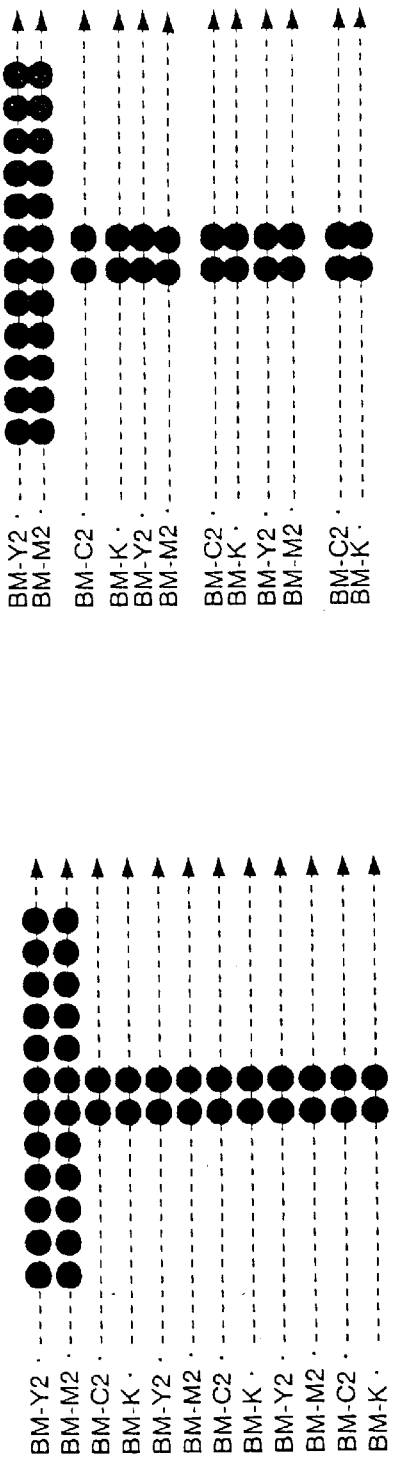
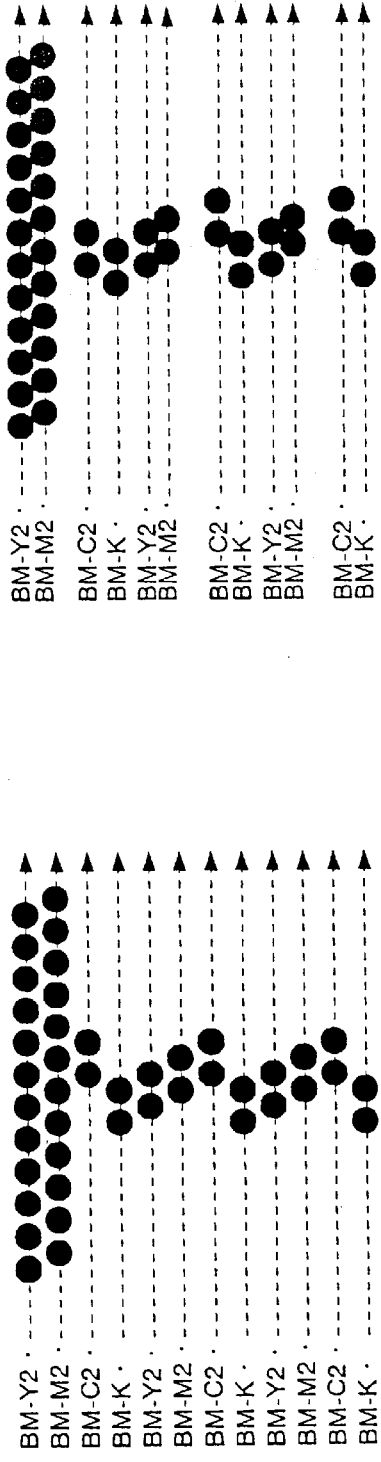
FIG. 3A  FIG. 3B  FIG. 3C  FIG. 3D

IMAGE FORMING APPARATUS FOR MAINTAINING A CONSTANT BEAM SCANNING STATE

BACKGROUND OF THE INVENTION

The present invention relates to an image forming apparatus with a multi-beam scanning system. Particularly, this invention relates to an image forming apparatus including a printer and a fax machine, etc., that overcomes a problem in that a formed image is blurred due to positional shifting of dots on each line which occurs when image magnification is not constant over light beams in simultaneous formation of dots on several lines in an image-forming area with light beams. Moreover, the present invention relates to an image forming apparatus that overcomes a problem in that an image-forming area will be shifted due to difference in image magnification on a plane to be exposed to light beams, by detecting scanning light beams on the plane at least two points in the vicinity of the entire plane.

Several techniques have been proposed for image forming apparatus, for example, a plane paper copy machine (called PPC hereinafter) or a laser printer that prints out data from an image data supplying apparatus, such as a personal computer (called PC hereinafter) and a digital camera, on regular sheets or OHP sheets. Known single-beam exposing system has gradually been replaced with multi-beam exposing system for enhancing image-forming speed in this type of image forming apparatus.

The multi-beam exposing system enhances an image-forming speed by simultaneous scanning several lines with laser beams. Such multi-beam exposing system is proposed, for example, in Japanese Unexamined Publication NO. 9-258125 disclosing digital beam-positional control, Japanese Un-examined Publication NO. 9-314901 disclosing beam-positional control in main scanning direction, Japanese Un-examined Publication NO. 10-76704 disclosing ladder-pattern sensors, Japanese Un-examined Publication NO. 10-142535 disclosing techniques for eliminating operational amplifier-offsetting, Japanese Un-examined Publication NO. 11-84280 disclosing power control, Japanese Un-examined Publication NO. 11-951432 disclosing several resolutions, Japanese Un-examined Publication NO. 11-202229 (Japanese Application NO. 10-6776) disclosing beam-positional control in main scanning direction, and Japanese Un-examined Publication NO. 10-356022 disclosing relative beam-positional control in sub scanning direction. These proposals mainly relate to light exposed position control. Particularly, Japanese Un-examined Publication NO. 11-202229 discloses precise beam-positional control in main scanning direction used in light beam scanning apparatus and image forming apparatus.

The known image forming apparatus, however, has the following drawbacks:

Light beams used for control are usually detected at edges on an area to be scanned due to optical system structure. The known image forming apparatus cannot generate constant light-beam shape or power on this area. Inconstant light-beam shape or power causes inaccurate detection of each beam position, thus resulting in inaccurate light beam control. Such problem mostly occur in using a compact polygon mirror having a small reflecting surface for light beam scanning for higher beam scanning speed. A compact and thus light polygon mirror relieves its load for increasing rotation number.

Moreover, difference in wavelength or power of several laser sources causes a problem in that a scanning-finishing point fluctuates even though each beam scanning-starting point is precisely controlled. In other words, it causes fluctuation in image-forming area, or image magnification for each beam due to difference in reflectivity of lenses or glasses caused by difference in wavelength over several light beams.

Furthermore, monochrome-color switching machines have a problem of increase in toner consumption in color registration control.

SUMMARY OF THE INVENTION

In order to overcome the foregoing problems for known image forming apparatus, a first purpose of the present invention is to decrease in toner consumption in color registration control for a color image forming apparatus, in detail, to attain high color overlapping accuracy by color registration control with minimum test pattern generation, followed by beam-positional control.

A second purpose of the present invention is to provide an image forming apparatus for efficient and rapid monochrome and color image forming. In other words, it is the purpose to solve problems on two types of color image forming apparatus most popular at present, thus providing an image forming apparatus with high color image-forming speed and much higher monochrome image-forming speed.

A third purpose of the present invention is to attain higher image quality in high-speed image-forming apparatus using multi-beam scanning system. An image forming apparatus with high beam positional-detection accuracy even at edges on an area to be scanned on which light beam shape or power tend to fluctuate enhances beam positional-control accuracy. Moreover, an image-forming apparatus having a detector for detecting an image-forming area (image magnification) for each beam to detect image magnification for each light beam provides image-forming areas (image magnification) matched for several light beams for forming high image of quality irrespect of difference in wavelength of light beams.

In order to attain the first purpose, the image forming apparatus according to the present invention maintains a constant beam scanning state so that light beams scan each drum always in the same state when a desired color-overlapping accuracy is obtained by one-time color registration control, thus achieving constantly fine color overlapping without generating a test patterns several times or consuming toner unnecessarily. The beam scanning state is monitored by sensors provided in the vicinity of a photosensitive drum.

An optimum scanning state may be different for each light beam in a high-speed monochrome image formation mode and a color image formation mode. A control state for each light beam in each mode is stored in memory for reproduction of the same state without performing again color registration control when the monochrome image formation mode is switched to the color image formation mode, thus consuming no toner unnecessarily and also shortening a waiting time for image formation when the mode is switched.

In order to attain the second purpose, the image forming apparatus according to the present invention achieves efficient and high-speed color image formation based on 4-tandem system in combination of multi-beam exposure technique. Color images are formed by scanning 4-color drums with four light beams like a conventional 4-tandem system at a speed the same as the conventional system. On the other hand, monochrome images are formed with light beams including beams which usually used for colors other than monochrome image formation. For example, in formation of K-image only, light beams used for Y-, M- and C-image formation are all used for the K-image, thus achieving four-fold image formation performance. For such image formation, a transfer speed of each photosensitive drum and transfer section is adjusted to match an image-recording speed for high-speed operation with optimum control of other requirements.

Accordingly, the present invention is provided with a beam-passage switch in the laser scanning system for operating the apparatus efficiently. Moreover, sensors are provided in the vicinity of the photosensitive drum to determine whether each light beam has scanned a certain portion with no inclination or a certain scanning area (range), or whether each image magnification has provided a desired size, and also a control mechanism is provided for precisely scanning each photosensitive drum with each light beam based on information always correct when detected.

In order to attain the third purpose, the present invention provides an image forming apparatus for accurately detecting beam positions in a light beam scanning direction also accurately detecting image magnification. In general, sensors for detecting scanning light beams output different response waveforms depending on beam shape or power at edges of a scanning area at which beam shape and power relatively fluctuate, which provides incorrect information. The present invention therefore obtains a beam center position from information on a point at which sensors start to respond and another point at which they cease responding and, based on the center positional information, performs several types of control. This achieves several types of accurate control based on correct beam positional information even at the edges of scanning area at which beam size and power fluctuate, thus forming images at high accuracy. In other words, the image forming area is shifted to detect a point at which the sensors start to respond and another point at which the sensors cease responding for each light beam and, based on this information, define an image forming area for each light beam, thus forming images at high accuracy even though beam size and power are different over the light beams.

Against a problem of difference in image forming area, the present invention is provided with a detector to detect an image forming area (image magnification) for each light beam for image forming area setting for each light beam so that the centers of image forming areas of light beams meet each other for minimizing the effects of difference in detected image magnifications for the light beams. Moreover, adjustments to the clock frequency which is the basis for defining the image forming area for each light beam allows the image forming areas for the light beams to meet each other precisely. The present invention also provides selection of an optimum clock frequency as the basis for defining the image forming area for each light beam from among several clocks.

BRIEF DESCRIPTION OF DRAWINGS

FIG. 3A is a schematic view of an ideally exposed alphabet "T",

FIGS. 3B to 3D are schematic views of incorrectly formed alphabet "T" in inaccurate control of scanning position, inaccurate control of exposure timing, and inaccurate control of both scanning position and exposure timing, respectively;

DETAILED DESCRIPTION OF PREFERRED EMBODIMENTS

Preferred embodiments of image forming apparatus according to the present invention will be disclosed with reference to the attached drawings.

Figure 1:
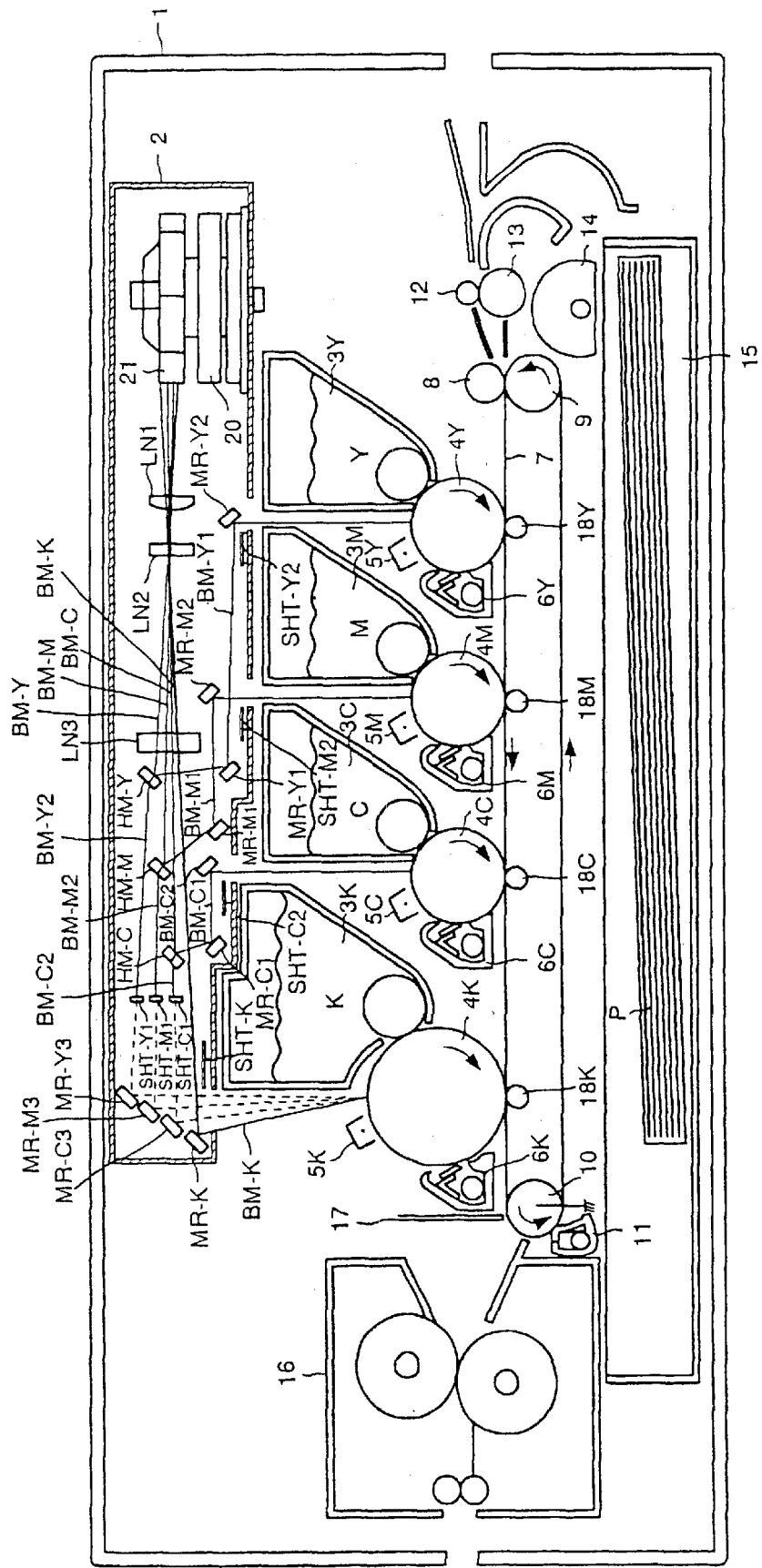
FIG. 1 is a schematic view of an embodiment of image forming apparatus in color mode according to the present invention.

FIG. 1 is a schematic view of the first embodiment of image forming apparatus according to the present invention. This is an example of application of the present invention to a 4-tandem color fax machine. In FIG. 1, an image forming apparatus 1 includes an optical unit 2, developers 3Y, 3M, 3C and 3K for forming an image for each color, photosensitive drums 4Y, 4M, 4C and 4K, chargers 5Y, 5M, 5C and 5K, cleaners 6Y, 6M, 6C and 6K, a transfer belt 7, a sucking roller 8, a transfer belt rollers 9 and 10, a transfer belt cleaner 11, aligning rollers 12 and 13, a paper feed roller 14, a paper feed cassette 15 for stocking and feeding sheets P, a fixing device 16, a fiber sensor 17, and transfer rollers 18Y, 18M, 18C and 18K.

The optical unit 2 consists of a polygon motor 20 and a polygon mirror 21, both described later, as the basic components. Light beams emitted by several light sources housed in the unit 2 scan the photosensitive drums 4Y, 4M, 4C and 4K corresponding to respective colors.

The 4-tandem color copy machine having the foregoing structure performs a color image-forming process which will be disclosed briefly.

The photosensitive drums 4Y, 4M, 4C and 4K and the transfer belt 7 rotate by a drive motor (not shown) at a certain speed on their outer periphery. The chargers 5Y, 5M, 5C and 5K arranged as facing the surfaces of the photosensitive drums 4Y, 4M, 4C and 4K, respectively, charge the photosensitive drums 4Y, 4M, 4C and 4K at certain potentials. Four light beams emitted by the optical unit 2 are focussed, as scanning beams having a spot of necessary resolution, on positions to be exposed on the photosensitive drums 4Y, 4M, 4C and 4K which are materials to be exposed, thus the drums being exposed by scanning. The exposure forms electrostatic latent images corresponding to an image signal on the photosensitive drums 4Y, 4M, 4C and 4K.

The electrostatic latent images formed on the photosensitive drums 4Y, 4M, 4C and 4K are developed using toner, a developing agent, supplied from the developers 3Y, 3M, 3C and 3K, thus forming toner images. The electrostatic latent image, for example, formed on the photosensitive drum 4Y is developed by the developer 3Y as a yellow toner image. Likewise, the electrostatic latent images formed on the photosensitive drums 4M, 4C and 4K are developed by the developers 3M, 3C and 3K, respectively, thus, being formed as a magenta toner image, a cyan toner image and a black toner image.

The sheets P stocked in the paper feed cassette 15 are conveyed to the aligning rollers 12 and 13 by the rotating paper feed roller 14, and after the edges are aligned (positional adjustment), conveyed to the sucking roller 8 and the transfer belt roller 9 by the rotating aligning rollers 12 and 13. The sheets P are conveyed by the rotating sucking roller 8 and the transfer belt roller 9 towards the transfer belt roller 10 and further conveyed in the reverse direction by the roller 10 while being sucked on the transfer belt 7 while a predetermined potential difference is being applied between the sucking roller 8 and the transfer belt roller 9.

The toner images formed on the photosensitive drums 4Y, 4M, 4C and 4K, which have been developed by the developers 3Y, 3M, 3C and 3K, respectively, are transferred on a sheet P at positions on which the transfer belt 7 and the transfer rollers 18Y, 18M, 18C and 18K touch each other. A predetermined potential applied to each of the transfer rollers 18Y, 18M, 18C and 18K generates static charges which serves to transfer the toner images on the photosensitive drums 4Y, 4M, 4C and 4K on the sheet P. The toner images of the four colors Y, M, C and K are overlapped with each other on the sheet P while being sucked on the transfer belt 7 by the foregoing operations, thus a color image being formed thereon.

The sheet P is then heated and pressed while passing through the fixing device 16, thus the toner images on the sheet P being melted and infallibly fixed thereon. The cleaners 6Y, 6M, 6C and 6K eliminate the residual toner on the photosensitive drums 4Y, 4M, 4C and 4K, which have completed image transfer on the sheet P, respectively. The photosensitive drums 4Y, 4M, 4C and 4K are then reset to the initial state, thus being ready for the next image-forming process. The transfer belt cleaner 11 eliminates extra toner attached on the transfer belt 7, which has completed sheet transfer, while passing through the cleaner 11, thus the transfer belt 7 being ready for the next sheet transfer. Moreover, the transfer belt 7 is subjected to several potential applications at the sheet sucking section and the toner transfer section, etc., however, since the belt 7 is made of a semiconductor material and the transfer belt roller 10 is grounded, the belt 7 returns to the initial state (ground potential) on completion of extra toner elimination. The foregoing process is repeated for successive color-image formation.

Disclosed next are the detailed structure of the optical unit 2 and an optical passage in image formation. The optical unit 2 houses, for example, four semiconductor lasers (not shown). A light beam emitted by each semiconductor laser is reflected at the surface of the polygon mirror 21 while rotating by the polygon motor 20 and scans the surfaces (to be exposed) of the photosensitive drums 4Y, 4M, 4C and 4K.

Here, light beams that have a possibility of reaching the photosensitive drums 4Y, 4M, 4C and 4K are called light beams BM-Y, BM-M, BM-C and BM-K, respectively. Scan beams controlled by the polygon mirror 21 pass through lenses LN1, LN2 and LN3. Each lens exhibits the characteristics to reform each light beam into a small diameter-beam and the fθ-characteristics to control the beam at a constant scanning speed on each photosensitive drum.

The light beam BM-Y that has a possibility of reaching the photosensitive drum 4Y passes through the lenses LN1, LN2 and LN3 and is reflected by a half mirror HM-Y by about 50% of its light components, thus the reflected light components becoming a light beam BM-Y1. The light beam BM-Y1 is then reflected by mirrors MR-Y1 and MR-Y2 and reaches the photosensitive drum 4Y. On the other hand, a light beam BM-Y2 that has passed through the half mirror HM-Y is shut out by a shield member (shutter) SHT-Y1 so that it will not reach any drum.

The light beam BM-M that has a possibility of reaching the photosensitive drum 4M passes through the lenses LN1, LN2 and LN3 and is reflected by a half mirror HM-M by about 50% of its light components, thus the reflected light components becoming a light beam BM-M1. The light beam BM-M1 is then reflected by mirrors MR-M1 and MR-M2 and reaches the photosensitive drum 4M. On the other hand, a light beam BM-M2 that has passed through the half mirror HM-M is shut out by a shield member (shutter) SHT-M2 so that it will not reach any drum.

The light beam BM-C that has a possibility of reaching the photosensitive drum 4C passes through the lenses LN1, LN2 and LN3 and is reflected by a half mirror HM-C by about 50% of its light components, thus the reflected light components becoming a light beam BM-C1. The light beam BM-C1 is then reflected by mirrors MR-C1 and MR-C2 and reachs the photosensitive drum 4C. On the other hand, a light beam BM-C2 that has passed through the half mirror HM-C is shut out by a shield member (shutter) SHT-C1 so that it will not reach any drum.

The light beam BM-K that has a possibility of reaching the photosensitive drum 4K passes through the lenses LN1, LN2 and LN3 and is reflected by a half mirror HM-K, thus reaching the drum 4K. As disclosed, the light beams emitted by four semiconductor lasers (not shown) are reflected by the surface of the polygon mirror 21 rotated by the polygon mirror 20 and then pass through the respective passages to become light beams to scan the respective photosensitive drums, thus enabling color image formation.

The shield members (shutters) SHT-Y2, SHT-M2, SHT-C2 and SHT-K shut out the light beams that go to the photosensitive drums 4Y, 4M, 4C and 4K but not shut them out in color image formation. In detail, the shield members (shutters) SHT-Y2, SHT-M2 and SHT-C2 shut light beams in monochrome image formation which will be described later. On the other hand, the shield member (shutter) SHT-K shuts a light beam during several operations to the light beam before monochrome image formation which will be described later, or shuts a light beam so that the photosensitive drum will not suffer from unnecessary exposure.

The copy machine having the structure described above would differ in power of the light beams that scan the photosensitive drums 4Y, 4M and 4C and the light beam that scans the photosensitive drum 4K due to difference in efficiency on their passages if the four semiconductor generate light of beams of equal power. In this embodiment, however, a semiconductor laser power to emit a light beam for scanning the photosensitive drum 4Y is set about 50% of the other semiconductor laser power or the reflectivity of the mirror MK-K is set about 50% of the other mirrors, thus enabling scanning the photosensitive drum 4K using the same beam power as the other light beams.

Figure 2:
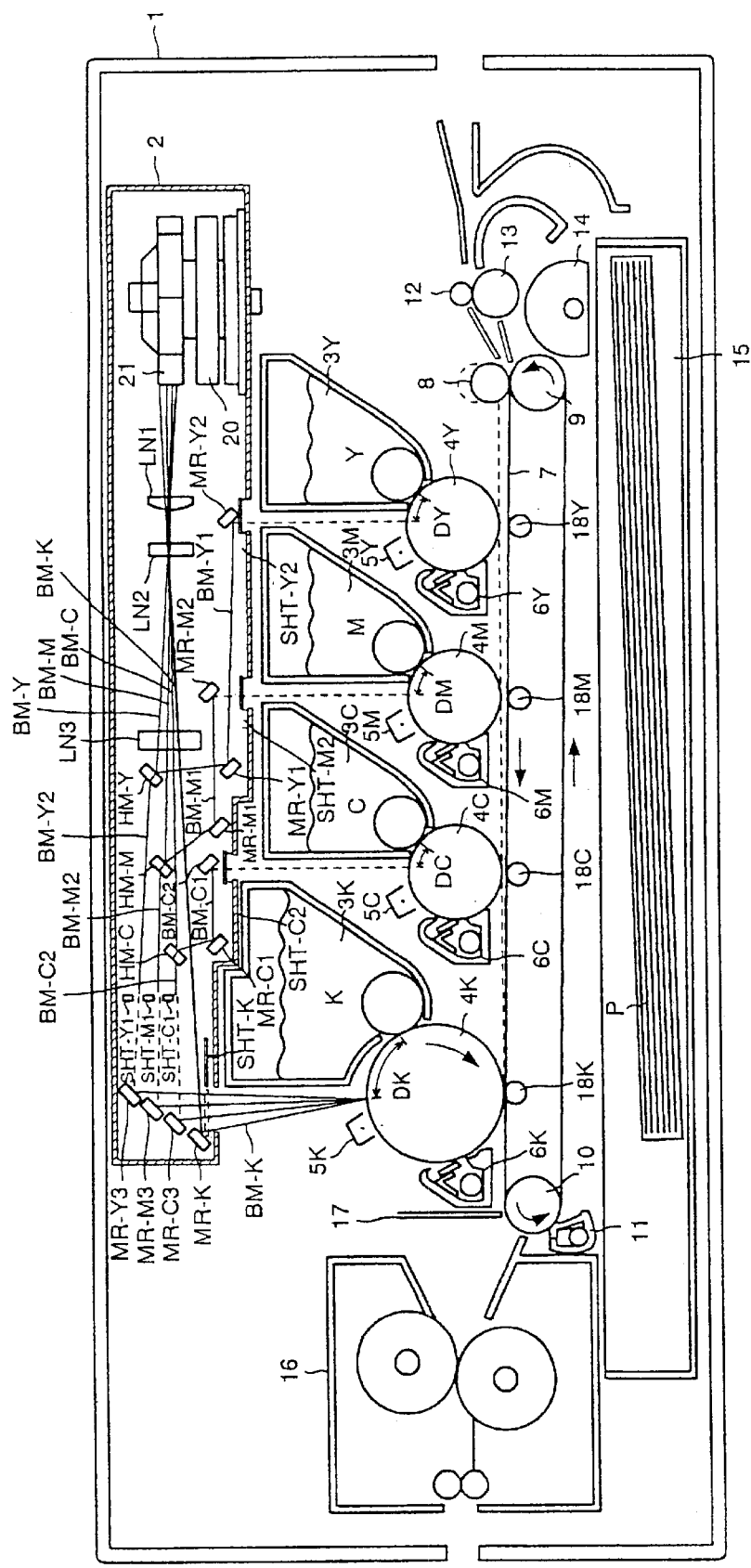
FIG. 2 is a schematic view of an embodiment of image forming apparatus in monochrome mode according to the present invention.

Disclosed so far are the structure and operations of the image forming apparatus and the passages of light beams in the optical unit 2 in color image formation. Disclosed next with reference to FIG. 2 are operations and passages of light beams in optical system in high-speed monochrome image formation for the copy machine having the same structure. The monochrome image formation in this embodiment uses black toner.

The photosensitive drum 4K, the transfer belt 7 and the fixing device 16 are rotated by a drive motor (not shown) at a speed on their periphery four times higher than the color image formation. On the other hand, the photosensitive drums 4Y, 4M and 4C which will not be used do not rotate and also developing rollers of the developers 3Y, 3M and 3C do not rotate.

The charger 5K provided as facing the surface of the photosensitive drum 4K charges the surface thereof at a certain potential. The chargers 5Y, 5M and 5C provided as facing the surfaces of the photosensitive drums 4Y, 4M and 4C (not rotating) will not work. Unused components that are not be operated as described above protect the copy machine from degradation which may otherwise occur.

Different from color image formation, all four light beams emitted by the optical unit 2 are focussed, as scanning beams having a spot of necessary resolution, a position to be exposed on the photosensitive drum 4K, thus the drum being exposed by scanning. In other words, the photosensitive drum 4K is simultaneously scanned by and exposed to the four light beams, thus forming an electrostatic latent image in accordance with an image signal. An optical beam passage in the optical unit 2 in this case will be explained later.

The electrostatic latent image formed on the photosensitive drum 4K is developed using toner (a developing agent) supplied from the developer 3K, thus forming a K-toner image.

The sheets P stocked in the paper feed cassette 15 are conveyed to the aligning rollers 12 and 13 by the rotating paper feed roller 14, and after the edges are aligned, conveyed to the sucking roller 8 and the transfer belt roller 9 by the rotating aligning rollers 12 and 13. The sheets P are conveyed by the rotating sucking roller 8, the transfer belt roller 9 and the aligning rollers 12 and 13 towards the transfer belt roller 10 and further conveyed in the reverse direction by the roller 10 while being sucked on the transfer belt 7 with a predetermined potential difference applied between the sucking roller 8 and the transfer belt roller 9.

The transfer operation through sheet conveyance passage in monochrome image formation mode is different from that through sheet conveyance passage in color image formation mode. In detail, as illustrated in FIG. 2, the transfer belt 7, the sucking roller 8, the transfer belt roller 9, and the transfer rollers 18Y, 18M and 18C are shifted downwardly by a drive motor (not shown) in the monochrome mode so that they will not touch the photosensitive drums 4Y, 4M and 4C, while the transfer belt is being controlled so that it touches the photosensitive drum 4K only.

The photosensitive drums 4Y, 4M and 4C (not rotating) are separated from the transfer belt 7 as above so that they will not touch each other, protects the drums from degradation which may otherwise be caused by friction. As disclosed, this embodiment selects an appropriate sheet conveyance passage either for color or monochrome in accordance with image formation mode.

The toner image on the photosensitive drum 4K, which has been developed by the developer 3K is transferred onto a sheet P where the transfer belt 7 and the transfer roller 18K touch each other. A predetermined potential applied to the transfer rollers 18K generates static charges which serves to transfer the toner image on the photosensitive drum 4K onto the sheet P. As disclosed, a black K-toner is transferred on the sheet P while being sucked by the transfer belt 7.

The sheet P is then heated and pressed while passing through the fixing device 16, thus the toner image on the sheet P being melted and infallibly fixed thereon. A fixing roller housed in the fixing device 16 is rotated at a speed four times higher than the color image formation. The cleaner 6K eliminates the residual toner on the photosensitive drum 4K which has completed image transfer to the sheet P. The photosensitive drum 4K is then reset to the initial state, thus being ready for the next image-forming process.

The transfer belt cleaner 11 eliminates extra toner attached on the transfer belt 7, which has completed sheet transfer, while passing through the cleaner 11, thus the transfer belt 7 being ready for the next sheet transfer. Moreover, the transfer belt 7 is subjected to several potential applications at the sheet sucking section and the toner transfer section, etc., however, since the bel 7 is made of a semiconductor material and the transfer belt roller 10 is grounded, the belt 7 returns to the initial state (ground potential) at these sections. The foregoing process is repeated for successive monochrome image formation at a speed four times higher than the color image formation.

Disclosed here is the features and structure of the monochrome (black) image-forming section. Monochrome images are formed more often compared to color images when thinking of frequency of color and monochrome image formation. Moreover, a image-forming speed for monochrome images is four times higher than that for color images in this embodiment, thus requiring high-speed components for the image forming apparatus. Particularly, the monochrome image-forming section requires high-speed processing, high durability and also a large stock of consumables, such as toner, compared to the other image processing section. This embodiment has the following structure to meet such requirements.

The photosensitive drum 4K is larger than the other photosensitive drums 4Y, 4M and 4C. In this embodiment, the photosensitive drum 4K is about 1.6 times larger than the other photosensitive drums 4Y, 4M and 4C. The present invention is, however, not limited to such a ratio and it is preferable to set a ratio of size in consideration of frequency of use, image-forming speed, etc. The reason for assembling the photosensitive drum 4K for black toner-image formation larger than the photosensitive drums 4Y, 4M and 4C for the other color toner-image formation is that a lager photosensitive drum under the same requirements offers high durability and longer life.

The developer 3K also has a large and high-capacity developing roller compared to the developers 3Y, 3M and 3C for the other colors. This requirement for the developer 3K in image formation at a speed four times higher than the other developers attains high durability with high-speed supply of a lot of toner.

A distance DK between a point to be exposed to another point to be developed in black is set as longer than distances DY, DM and DC each between a point to be exposed to another point to be developed in another color. The distance settings prevent a period from exposure to developing on the photosensitive drum 4K from being short.

As well known, whenever the surface of a photosensitive material is charged by a charger and exposed, the surface potential on the exposed surface will vary. Such change in surface potential requires a limited period of time. This causes a developing error when a point to be developed is developed before the surface potential varies enough. In other words, the photosensitive drum 4K sometimes rotates at a speed higher (four times higher in this embodiment) than the other photosensitive drums 4Y, 4M and 4C, thus requiring the distance DK between a point to be exposed to another point to be developed being set as longer enough than distances DY, DM and DC each between a point to be exposed to another point to be developed in the other colors. For example, when the distance each between a point to be exposed to another point to be developed for each of the photosensitive drums 4Y, 4M and 4C is set at a distance almost corresponding to a response speed of each photosensitive drum, the photosensitive drum 4K requires the distance between a point to be exposed to another point to be developed for four times longer than those distances.

In this embodiment, since there is enough distance between a point to be exposed to another point to be developed for the colors Y, M and C other than black, the distance DK between a point to be exposed to another point to be developed for the color black K is set as two times or a little bit more longer than the distances DY, DM and DC for the photosensitive drums 4Y, 4M and 4C.

Disclosed next is the passage of light beams in the optical unit for monochrome (black) image formation.

The deference in passage between color image formation and monochrome image formation lies in the locations of the shield members SHT-Y1, SHT-Y2, SHT-M1, SHT-M2, SHT-C1, and SHT-C2. The light beam BM-Y1 which has reached the photosensitive drum 4Y in color image formation will not reach the photosensitive drum 4Y because it is shielded by the shielding members. On the other hand, the light beam BM-M2 that has passed the half mirror HM-M is reflected by the mirror MR-M3 and reaches the photosensitive drum 4K. The light beam BM-K which has reached the photosensitive drum 4K in color image formation reaches the photosensitive drum 4Y with no change.

As disclosed above, in monochrome image formation mode, optical passages to the photosensitive drums 4Y, 4M and 4C are shut by the shield members SHT-Y2, SHT-M2, and SHT-C2 whereas the shield members SHT-Y1, SHT-M1, and SHT-C1 are shifted to provide an optical passage to the photosensitive drum 4K. The shield members SHT-Y1, SHT-M1, SHT-C1, SHT-Y2, SHT-M2, and SHT-C2 are opened or closed by a driver (not shown) and controlled by a main controller which will be disclosed later.

As disclosed, the light beams from the four semiconductor lasers (not shown) are reflected at the surface of the polygon mirror 21 while being rotated by the polygon motor 20 and then these all four beams scan the photosensitive drum 4K after passing through each optical passage, thus enabling high-speed monochrome image formation.

The image forming apparatus as having the structure described above would have a difference in power for scanning and exposing the photosensitive drum 4K due to the existence or non-existence of half mirror if the four semiconductor lasers output light beam of the same power. In order to solve such a problem, the reflectivity of the mirror for the light beam BM-K is lowered to about 50% of that for the other mirrors, thus enabling scanning the photosensitive drum 4K with the same power for all light beams.

It is preferable to detect each beam power while scanning the photosensitive drum 4K and control the power to attain the same power for all the beams, to provide the same power precisely, which will be disclosed later. Disclosed so far are the structure of the image forming apparatus and light beam passage in the optical unit 2 in monochrome image formation.

Disclosed next is arrangement of light beams on the photosensitive drum 4K in monochrome image formation. Images are formed using four light beams in monochrome image formation as described above. FIGS. 3A to 3D illustrate the relationship between a scanning track of each of four light beams and dots (points to be exposed) that form an image, for example, a character "T" one of the alphabets using the four light beams. FIG. 3A illustrates ideal exposure in which all the light beams BM-Y2, BM-M2, BM-C2 and MB-K ideally scan the exact positions with ideal exposure timing for dot formation, thus forming the character "T" correctly.

Contrary to this, FIGS. 3B to 3D illustrates errors in formation of the character "T". In detail, FIGS. 3B to 3D teach an error in control of positions to be scanned, in control of exposure timing, and in control of both positions to be scanned and exposure timing, respectively. It is apparent from these figures that no correct character "T" has been formed. Accordingly, the important factors for image formation using several light beams are positions to be scanned and exposure timing (main scanning position) for dot formation, and also uniform light beam power for several beams. The present invention installs the system to detect positions to be scanned by each light beam, exposure timing and exposure power for precise control.

Figure 4:
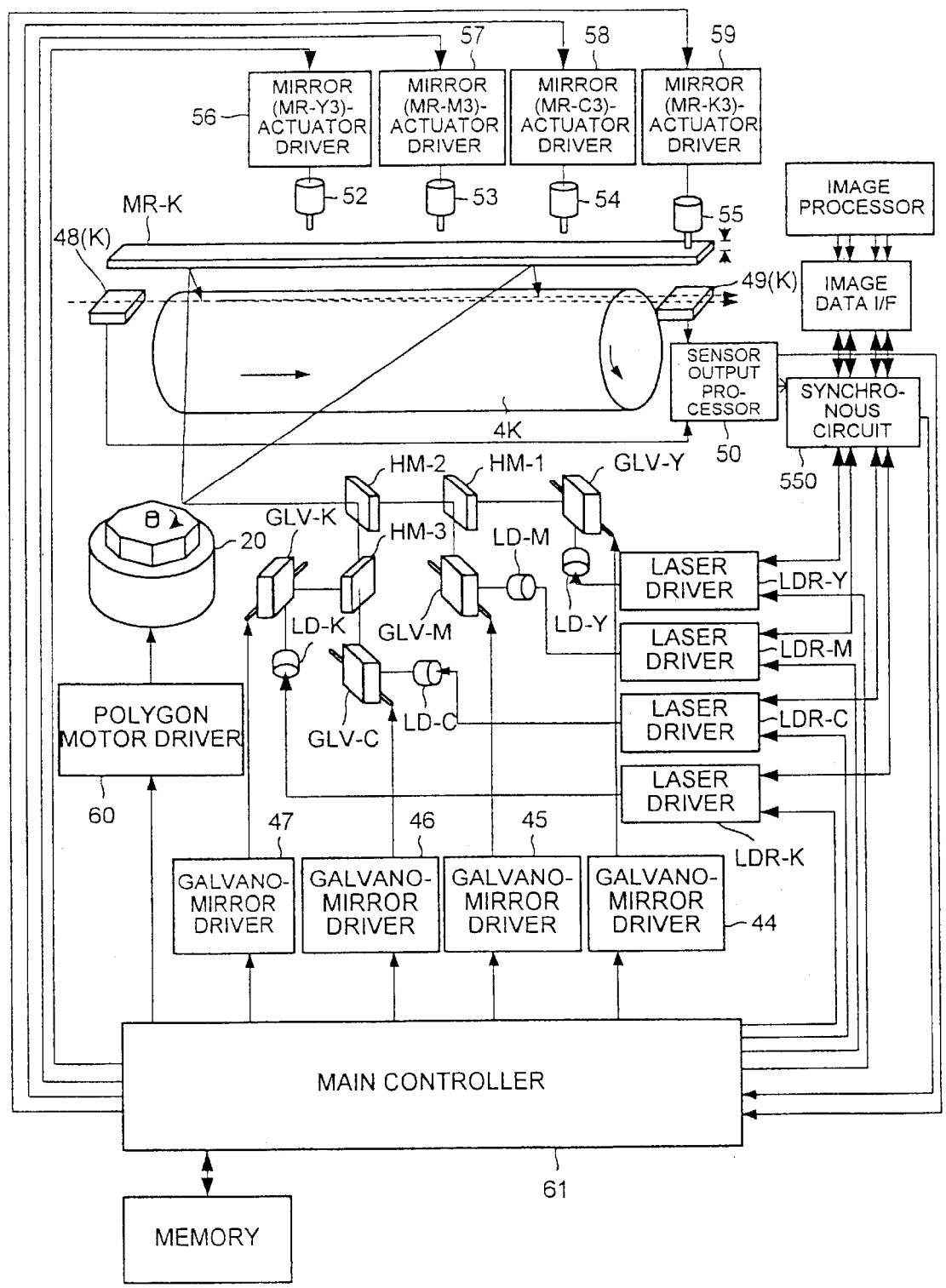
FIG. 4 is a block diagram of a light beam control system in embodiments of image forming apparatus according to the present invention.

Light beam control is described briefly with reference to FIG. 4. A semiconductor laser LD-Y for emitting a light beam BM-Y is driven by a laser driver LDR-Y. The light emitted by the laser driver LDR-Y passes through a finite lens (not shown) and then incident to a galvanomirror GLV-Y (a scanning position changer). A light beam reflected by the galvanomirror GLV-Y passes through the half mirrors HM-1 and HM-2 and then incident to the polygon mirror 21 rotated by the polygon motor 20.

A semiconductor laser LD-M for emitting a light beam BM-M is driven by a laser driver LDR-M. The light emitted by the laser driver LDR-M passes through a finite lens (not shown) and then incident to a galvanomirror GLV-M (a scanning position changer). A light beam reflected by the galvanomirror GLV-M is further reflected by the half mirror HM-1 but passes through the half mirror HM-2, and then incident to the polygon mirror 21 rotated by the polygon motor 20.

A semiconductor laser LD-C for emitting a light beam BM-C is driven by a laser driver LDR-C. The light emitted by the laser driver LDR-C passes through a finite lens (not shown) and then incident to a galvanomirror GLV-C (a scanning position changer). A light beam reflected by the galvanomirror GLV-C passes through the half mirror HM-3 but reflected by the half mirror HM-2, and then incident to the polygon mirror 21 rotated by the polygon motor 20.

A semiconductor laser LD-K for emitting a light beam BM-K is driven by a laser driver LDR-K. The light emitted by the laser driver LDR-K passes through a finite lens (not shown) and then incident to a galvanomirror GLV-K (a scanning position changer). A light beam reflected by the galvanomirror GLV-K is further reflected by the half mirrors HM-3 and HM-2, and then incident to the polygon mirror 21 rotated by the polygon motor 20.

As described, the structure shown in the middle section of FIG. 4 can change/adjust the positions to be scanned on the photosensitive drum 4K by varying angles of the galvanomirrors GLV-Y, GLV-M, GLV-C and GLV-K for the corresponding light beams. The passages of light beams after the polygon mirror 21 is the same as described with reference to FIGS. 1 and 2, hence description is omitted here. In color image formation, the photosensitive drums 4Y, 4M and 4C for respective color toners are scanned by the corresponding light beams whereas, in monochrome image formation, the photosensitive drum 4K is scanned by all light beams as described above.

Therefore, change in position to be scanned on the photosensitive drums 4Y, 4M, 4C and 4K can be performed by the adjustment of angles of the galvanomirrors GLV-Y, GLV-M, GLV-C and GLV-K. This suggests that color registration control (color overlapping control) can be precisely performed at or narrower than one line which is otherwise be performed at one line only if no galvanomirrors are provided.

Disclosed with reference to again FIG. 4 is the passage of the light beams after the polygon mirror 21, taking the light beam BM-K as an example from among the four beam. A light beam reflected by the polygon mirror 21 passes through several lenses, for example, LN1, LN2 and LN3 (not shown) but reflected by a mirror MR-K, and then scans the photosensitive drum 4K. The mirror MR-K is adjusted its angel by an actuator 55, as shown in FIG. 4. The change in angle of the mirror MR-K can vary an angle of a track of the scanning light beam BM-K on the photosensitive drum 4K.

The light beam BM-K scans the photosensitive drum 4K almost perpendicular to a rotation direction of the photosensitive drum 4K. Change in angle of the mirror MR-K can adjust at a minute amount the slant angle of the track (scanning line) of the scanning light beam. On the other hand, change in angle of the galvanomirror GLV-K does not adjust the angle of the track (scanning line) of the scanning light beam BM-K on the photosensitive drum 4K but shifts the track in parallel. According to the mechanism described above, the track (scanning line) of the scanning light beam BM-K on the photosensitive drum 4K can be controlled on its scanning positions and angle of incidence by adjusting the angles of the galvanomirror GLV-K and the mirror MR-K.

The mechanism described above is not only for the light beam BM-K but also for the other light beams BM-Y2, BM-M2 and BM-C2. In detail, the track (scanning line) of the scanning light beam BM-Y2 on the photosensitive drum 4K can be controlled on its scanning positions and angle of incidence by adjusting the angles of the galvanomirror GLV-Y and the mirror MR-Y3. The track (scanning line) of the scanning light beam BM-M2 on the photosensitive drum 4K can be controlled on its scanning positions and angle of incidence by adjusting the angles of the galvanomirror GLV-M and the mirror MR-M3. Moreover, the track (scanning line) of the scanning light beam BM-C2 on the photosensitive drum 4K can be controlled on its scanning positions and angle of incidence by adjusting the angles of the galvanomirror GLV-C and the mirror MR-C3.

Described so far with reference to FIG. 4 is that all light beams scan the photosensitive drum 4K in monochrome image formation. The structure shown in FIG. 4 is simplified for brevity. Omitted here after the polygon mirror are the lenses LN1, LN2 and LN3, the half mirrors HM-Y, HM-M and HM-C, the light beams BM-Y2, BM-M2 and BM-C2, the mirrors MR-Y1, MR-M1 and MR-C1, the shied members SHT-Y2, SHT-M2 and SHT-C2, and so on. Mirror actuators 52, 53 and 54 in the figure control the angles of the mirrors MR-Y3, MR-M3 and MR-C3 (not shown). Like the mirror actuator 55 that controls the angle the mirror MR-K, a main controller 61 shifts each mirror up and down at its edge using mirror-actuator drivers 56, 57 and 58 to control the angle of a track (scanning line) of each scanning light beam on the photosensitive drum 4K.

Figure 5:
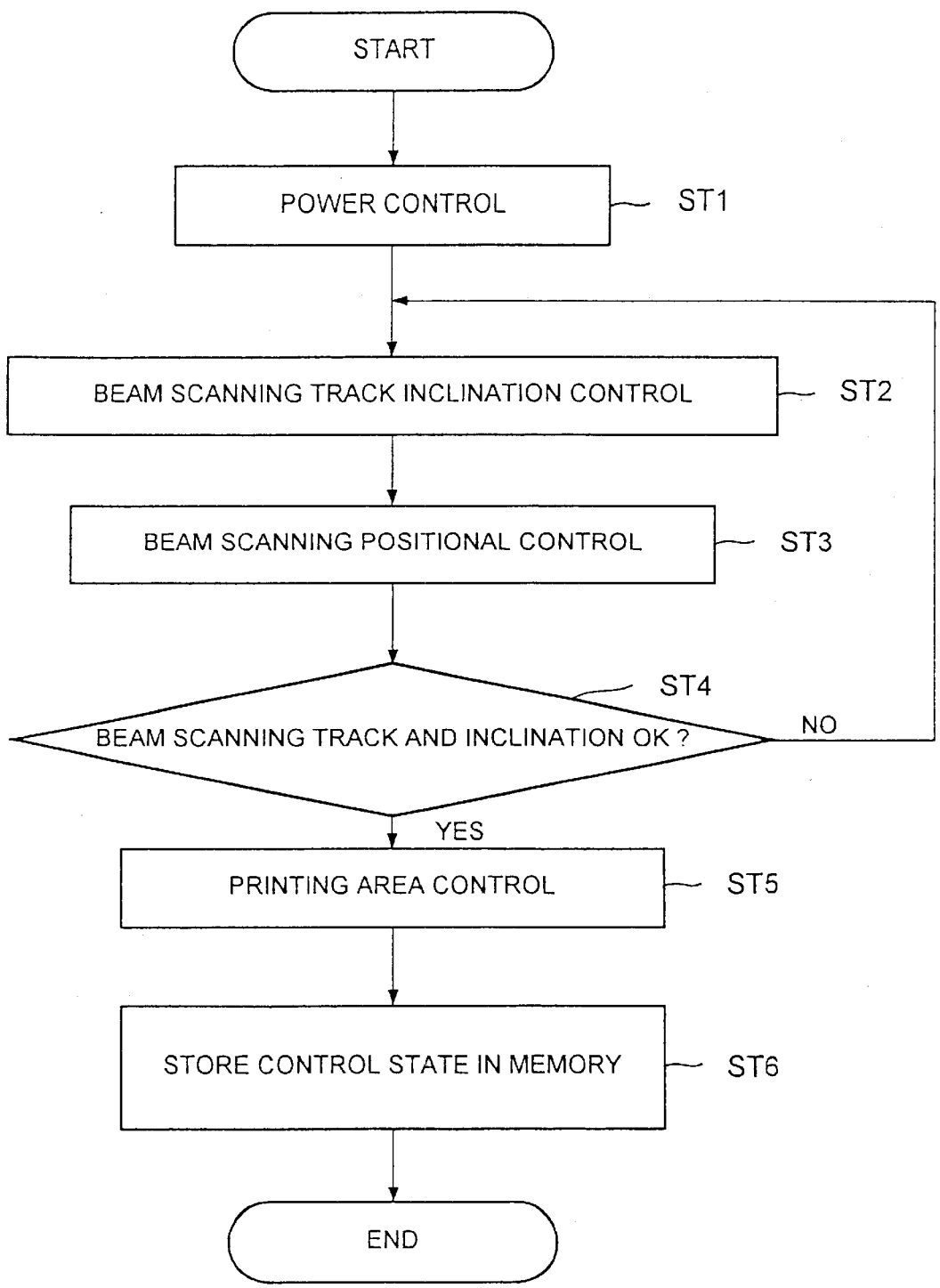
FIG. 5 is a flow chart indicating a control flow of four-light beam scanning in monochrome image formation mode.

Described briefly with reference to the flow chart shown in FIG. 5 is control in which four light beams ideally scan the photosensitive drum 4K in monochrome image formation mode. As shown in FIG. 5, the main controller 61 controls the power of the light beams so that the beams have the equal power while scanning the photosensitive drum 4K in step ST1. The control in step ST1 is disclosed in detail for the sequence in which a light beam power is detected and adjusted to a certain value for the light beam MM-K.

The main controller 61 rotates the polygon motor and drives the laser LD-K to emit the light beam BM-K so that it scans a sensor 48. The polygon mirror is rotated by a polygon motor driver 60 in response to a rotation command from the main controller 61. The light beam is emitted by the laser LD-K driven by the laser driver DR-K in response to an emission command from the main controller 61. It is preferable to control the laser LD-K so as not to emit a light beam at the scanning timing of the light beam BM-K on the photosensitive drum 4K so as not to expose the photosensitive drum 4K or the shied member SHT-K to shut out the light beam BM-K from going to the photosensitive drum 4K. Accordingly, the sensor 48 detects the light beam power while the light beam BM-K is being controlled so that it scans the sensor 48 but not the photosensitive drum 4K.

The sensor 48 outputs a signal proportional to the detected light beam power to a sensor output processor 50. The processor 50 converts the signal from the sensor 48 into a digital signal corresponding to the light beam power and sends it to the main controller 61. The main controller 61 recognizes the power of the light beam BM-K on the sensor 48 based the digital signal sent from the sensor output processor 50 and outputs a command to the laser driver LDR-K to adjust the power if deviated from a predetermined power. Accordingly, the main controller 61 controls the power of the light beam BM-K while scanning the photosensitive drum 4K.

Likewise, the main controller 61 controls the power of the light beams BM-Y1, BM-M2 and BM-C2 at respective predetermined power while scanning the photosensitive drum 4K. When the sensor 48 cannot detect the scanning light beams, which means the positions to be scanned are out of place from the sensor, the corresponding gavanomirror driver 44 or 47 is driven to adjust the sensor 48 so that it can detect the light beam power. The power of four light beams are thus made equal as disclosed above.

Again in the flow chart of FIG. 5, the main controller 61 controls the light beams to adjust inclination of their tracks (scanning lines) of scanning. The control sequence of track of scanning beams is disclosed in detail taking the light beam BM-K as an example. The main controller 61 rotates the polygon mirror 21 and drive the laser LD-K to emit the light beam BM-K so that it scans the sensor 48 and also a sensor 49. The polygon mirror 21 is rotated by the polygon motor driver 60 in response to a rotation command from the main controller 61. The light beam LD-K is emitted by the laser LD-K driven by the laser driver DR-K in response to an emission command from the main controller 61.

Like the sequence of detecting light beam power disclosed above, it is preferable to control the laser LD-K so as not to emit a light beam at the scanning timing of the light beam BM-K on the photosensitive drum 4K so as not to expose the photosensitive drum 4K or the shied member SHT-K to shut out the light beam BM-K from going to the photosensitive drum 4K. Accordingly, the inclination of the track of the scanning light beam BM-K based on the output of the sensors 48 and 48 while the light beam BM-K is being controlled to scan the sensors 48 and 49.

Disclosed next is control of inclination of the track of scanning light beam based on the principle of inclination detection and the detected value. The sensors 48 and 49 have the function of varying each output in accordance with a position through which a light beam passes in addition to detection of light beam power. Each of the sensors 48 and 49 outputs a signal in accordance with a position through which a light beam passes to the sensor output processor 50. The processor 50 converts the sensor output into a digital signal in accordance with the position through which the light beam passes to the main controller 61.

The main controller 61 recognizes the inclination of the light beam based on the balance between the two digital signals converted from the sensor output supplied from the sensor output processor 50. For example, when the two sensor output are equal to each other, this suggests that the track (scanning line) of scanning of light beam is not inclined with respect to the photosensitive drum 4K, or a desired angle relationship is maintained. On the other hand, when the two digital signals based on the output of the sensors 48 and 49 are out of balance, this suggests that the track (scanning line) of scanning of the light beam BM-K is inclined with respect to the photosensitive drum 4K.

When the track of scanning of light beam is inclined, the main controller 61 adjusts the angle of the mirror MR-K to correct the inclination of the optical axis. A correction drive signal in accordance with the detected inclination is sent to a mirror (MR-K)-actuator driver 59 to drive the driver 55 for adjustment of the inclination of the mirror MR-K, thus controlling the two digital signals, or the output of the sensors 48 and 49 becoming equal to each other. Likewise, for the inclination of the other light beams BM-Y2, BM-M2 and BM-C2, drive signals are sent to mirror actuator drivers 56 to 58 to drive actuators 52 to 54, respectively, for adjusting the angle of the mirror MR-K so that two output from the sensors 48 and 49 become equal to each other. When impossible to detect a light beam that is scanning the sensors 48 and 49, it means that the scanning position of the light beam is out of place from the sensors, so that the corresponding gavanomirror GLV-Y, GLV-M, GLV-C or GLV-K is driven by the corresponding valvanomirror driver 44, 45, 46 or 47 for the sensors 48 and 49 to accurately detect the light beam power. As disclosed, the inclination of the optical axes of the four light beams are adjusted for their tracks (scanning lines) of scanning.

Again, in FIG. 5, the main controller 61 controls the scanning position of each light beam at a certain position. The main controller 61 rotates the polygon mirror 21 and drives the laser LD-Y to emit the light beam BM-Y so that it scans the sensor 48. The polygon mirror 21 is rotated by the polygon motor 20 which is rotated by the polygon motor driver 60 when a rotation command is sent thereto from the main controller 61. The light beam is emitted by the laser LD-Y driven by the laser driver DR-Y in response to an emission command from the main controller 61. Like detection of power and inclination of optical axis, it is preferable to control the laser LD-K so as not to emit a light beam at the scanning timing of the light beam on the photosensitive drum 4K so as not to expose the photosensitive drum 4K or the shied member (shutter) SHT-K to shut out the light beam from going to the photosensitive drum 4K. Accordingly, the sensor 48 detects the light beam power while the light beam BM-Y2 is being controlled so that it scans the sensor 48, thus detecting the optical axis position of the light beam BM-Y2 for the track (scanning line) of scanning based on the sensor 48.

When the detected position scanned by the light beam BM-Y2 is shifted from a desired position, the main controller 61 controls the angle of the galvanomirror GLV-Y so that the light beam BM-Y2 passes the desired position. Next, the main controller turns off the laser LD-Y and drives the laser LD-M instead so that the light beam BM-M2 scans the sensor 48. The light beam is emitted by the laser LD-M driven by the laser driver DR-M in response to an emission command from the main controller 61. It is also preferable to control the laser LD-M so as not to emit a light beam at the scanning timing of the light beam BM-M2 on the photosensitive drum 4K so as not to expose the photosensitive drum 4K or the shied member (shutter) SHT-K to shut out the light beam from going to the photosensitive drum 4K. Accordingly, the sensor 48 detects the position of track (scanning line) of the scanning light beam BM-M2 while being controlled to scan the sensor 48. When the detected position scanned by the light beam BM-M2 is out of place from the desired position, the angle of the galvanomirror GLV-M is controlled so that the light beam BM-M2 passes the desired position. Likewise, the light beams BM-C2 and BM-K are controlled with detection of positions they pass, and thus the four light beams are controlled so that they pass through (scan) the predetermined positions on the sensor 48. The predetermined positions on the sensor 48 are decided based on recording pitch (resolution), for example, the positions are located at an interval of 42.3 $\mu$m scanned by the light beams in image formation at resolution of 600 dpi.

As disclosed, the four light beams BM-Y2, BM-M2, BM-C2 and BM-K are controlled for scanning in parallel at a predetermined interval. It is, however, preferable that detection of inclination of and interval between the light beams is repeatedly performed to correct them with fine adjustment control to overcome a problem in that the inclination may vary at a minute amount after the interval control. In the decision step ST4, decision is made any time as to whether or not inclination and position of the track of scanning light beam or optical axis is correct. If determined that inclination of the track of scanning light beam or optical axis is not correct, the process returns to step ST2 for adjustment of inclination of the track of scanning light beam. And, in step ST3, detection and adjustment of scanned positions are performed. If determined that inclination and position of the track of scanning light beam are not correct in decision sequence of step ST4, the process goes to step ST5.

In step ST5, the main controller 61 controls exposure timing (printing area) for each light beam in image formation. This control has the following two purposes:

1) adjust shifting of the relative positions of light beams in the scanning direction (main scanning direction offsetting adjustment), and 2) adjust variation in magnification of images for light beams (main scanning direction magnification adjustment).

The former is to adjust shifting which could happen due to complex mechanism of optically combining light beams emitted by different lasers for simultaneous scanning. The latter is to adjust variation which could happen due to difference in refractive index at lenses of light beams caused by different laser wavelength or difference in optical length of light beams.

As described briefly, the process from steps ST1 to ST5 achieves light beam control for accurate monochrome image formation. The control state up to printing area control in step ST5 is stored in a memory in step ST6. Optimum values can be retrieved from the memory for effective control.

Figure 6:
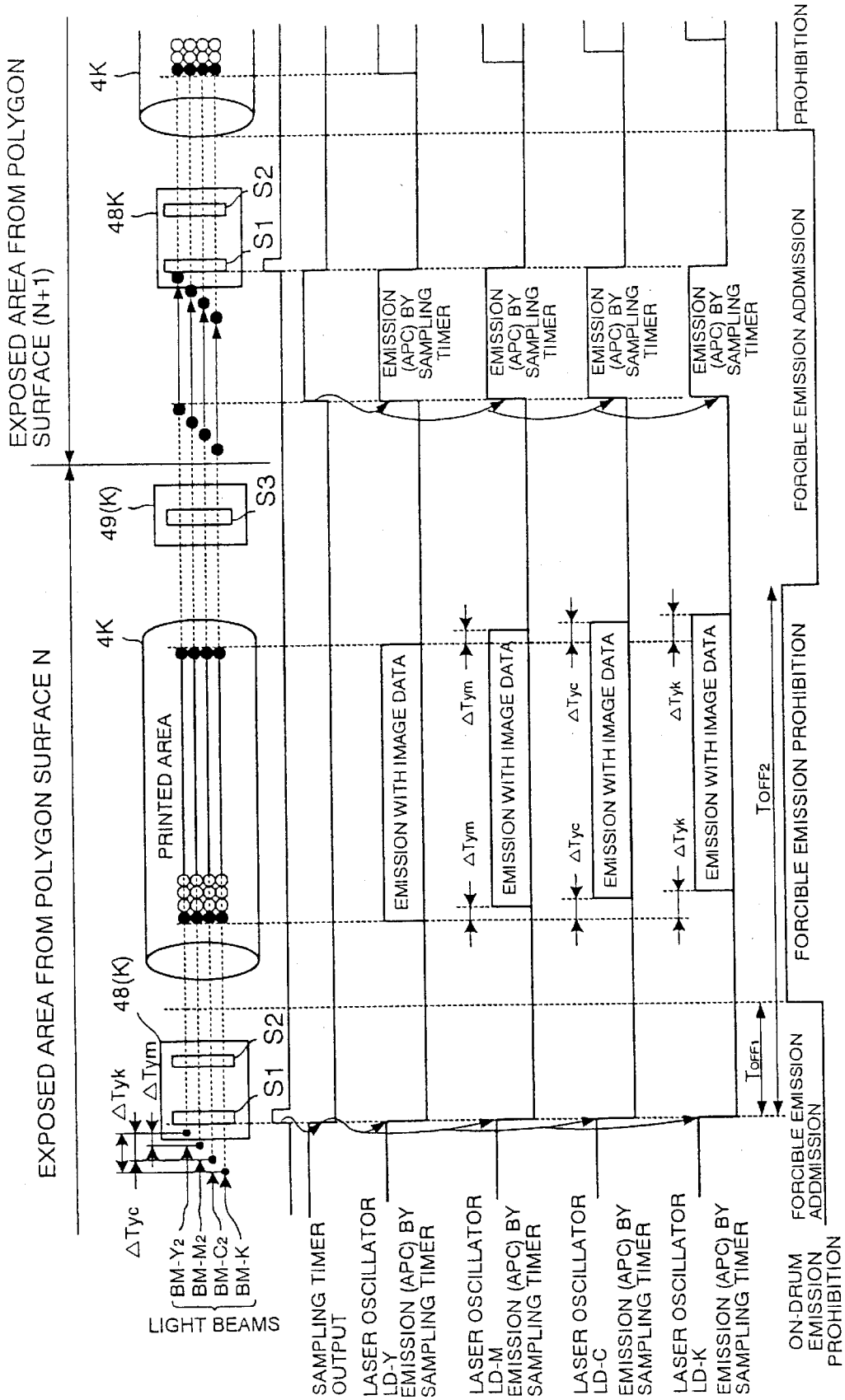
FIG. 6 illustrates the relationship among motion of each light beam, printing areas and respective signals in monochrome image formation mode.
Figure 7:
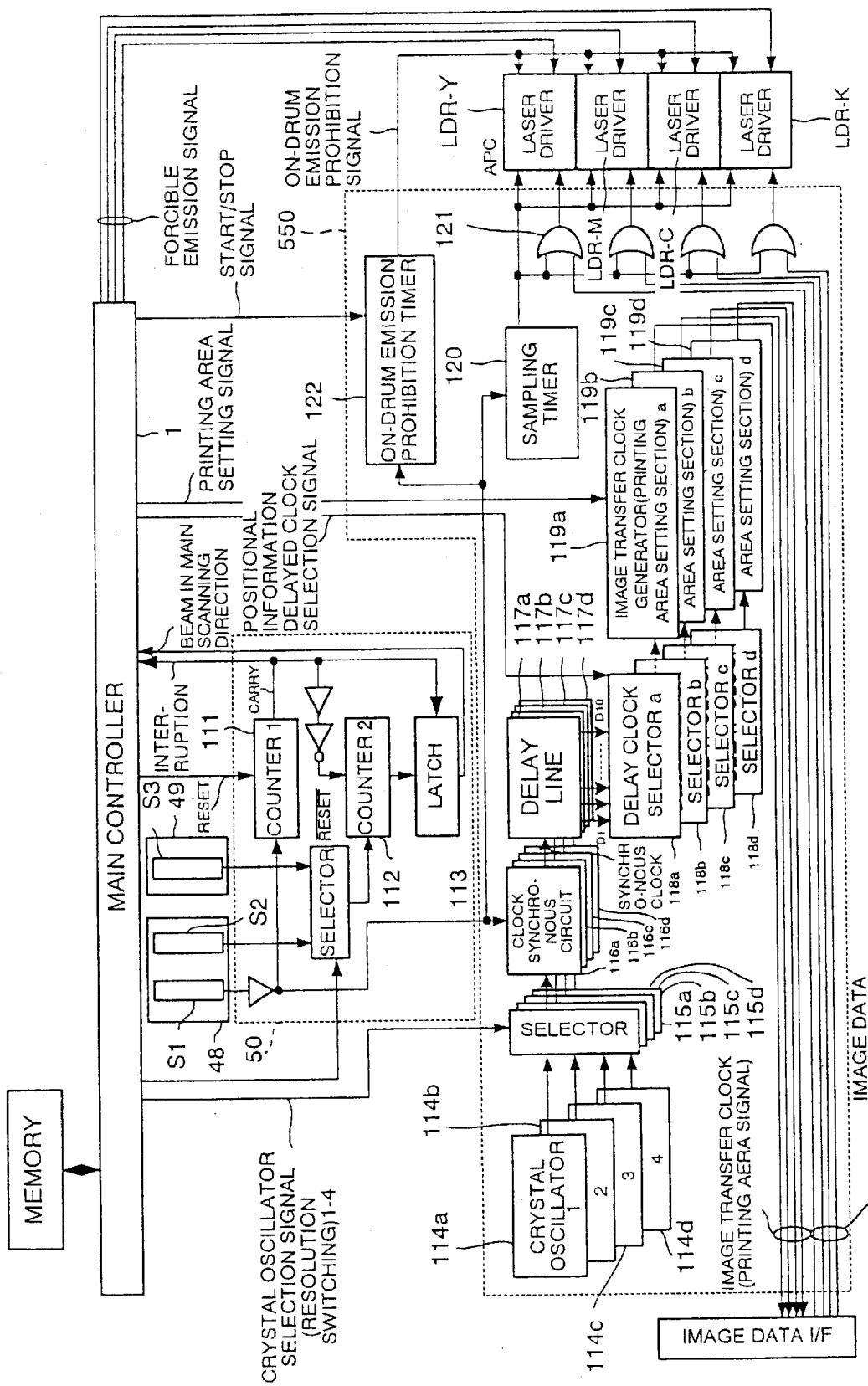
FIG. 7 is a block diagram of mechanism of adjusting image magnification and printing area.
Figure 8:
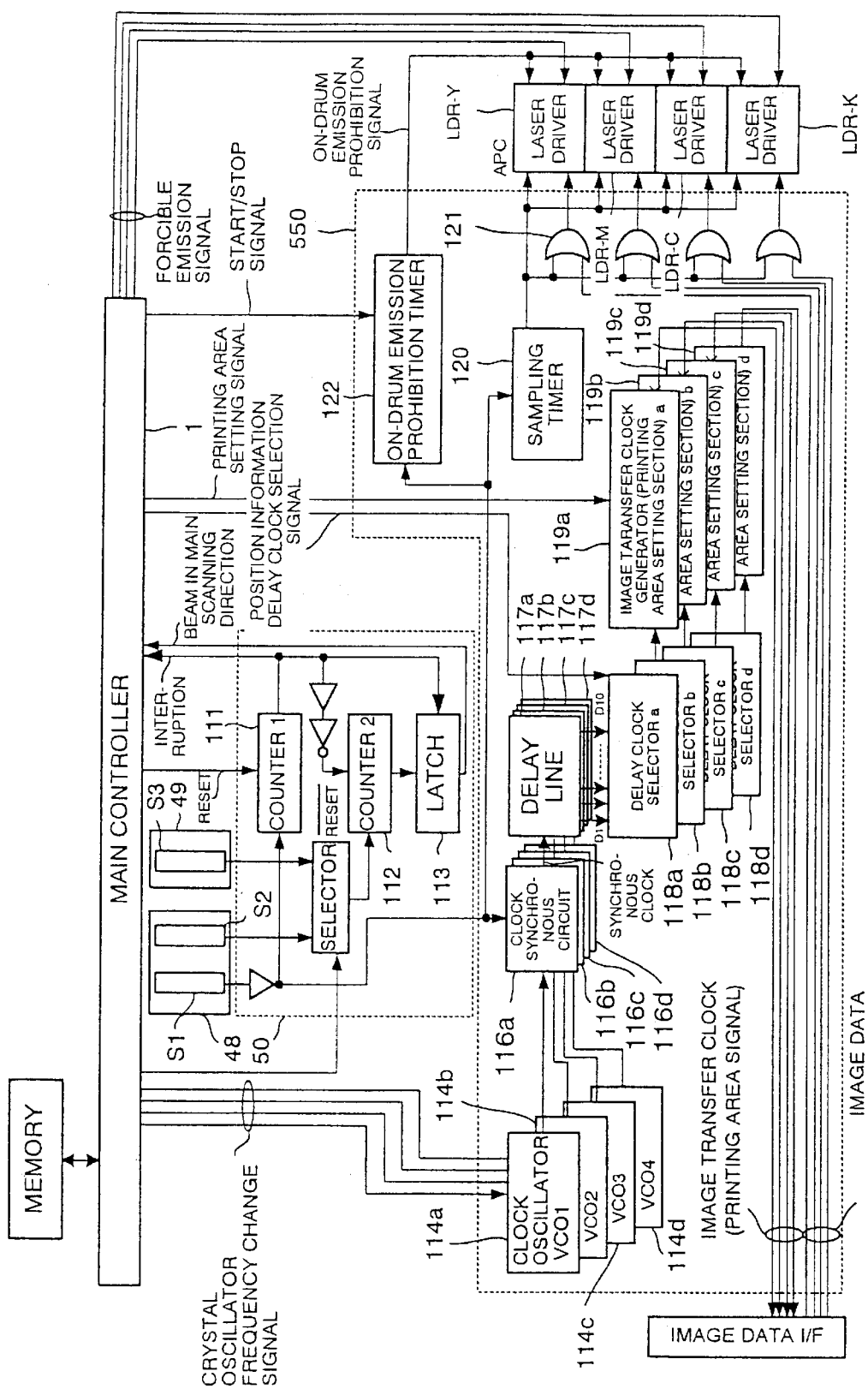
FIG. 8 is another block diagram of mechanism of adjusting image magnification and printing area.

Disclosed next with reference to FIGS. 6, 7 and 8 is the printing area control, or adjustment to variation in image magnification and shifting of printing area performed in step ST5 in the flow chart shown in FIG. 5. FIG. 6 teaches the relationship among motion of each light beam, printing area and respective signals. FIGS. 7 and 8 show circuit block diagrams for adjustment to image magnification and printing area. FIG. 6 illustrates time charts with the positional relationship between sensor patterns S1 ane S2 of the sensor 48 and the photosensitive drum 4K and also the positional relationship among exposure (printing) areas for the light beams BM-Y2, BM-M2, BM-C2 and BM-K decided by a sampling timer which will be disclosed later, light emitting areas based on image data and on-drum emission prohibition timer output.

As shown in FIG. 6, the sampling timer is reset by the output of the sensor pattern S1 of the sensor 48, to start counting clocks (not shown) from "0". The sampling timer outputs "HIGH" when the counted number reaches a predetermined number to drive the four lasers LD-Y, LD-M, LD-C and LD-K for emission. The value set on the sampling timer is usually is a value, as shown in FIG. 6, for emission of each light beam before the sensor 48 is scanned with and exposed to each light beam sent from the next surface of the polygon mirror after each light beam has passed the photosensitive drum 4K.

Scanning of each light beam starts from the next surface of the polygon mirror and the head light beam reaches the sensor pattern S1, thus the sampling timer being reset for repetition of the operations disclosed above. Each of the lasers LD-Y, LD-M, LD-C and LDF-K are forcibly emits a light beam for a predetermined period for each line within an area which is not related to image formation. Performed within this forcible emission period is automatic power control (APC) for maintaining light beam emission power of each laser.

An on-drum emission prohibition timer is disclosed. forcible emission includes emission with sampling timer output and also, as already disclosed, forcible emission operation of the laser drivers LDR-Y, LDR-M, LDR-C and LDR-K directly controlled by the main controller 61. The main controller 61 controls any laser for emission in this forcible emission operation for checking each laser condition and also for scanning the sensor 48 with light beams in positional control of passing (scanning) light beams or power control of each light beam.

Successive emission from the lasers LD-Y, LD-M, LD-C and LD-K will, however, expose the photosensitive drum 4K, thus causing the following problems:

The exposure of the photosensitive drum 4K while it is stopped intensively expose a particular portion of the drum 4K, thus causing local degradation thereof. On the other hand, the exposure of the photosensitive drum 4K while it is rotating could cause attachment (consumption) of a large amount of toner or attachment of carriers (charges).

The on-drum emission prohibition timer is used to prevent such problems. As shown in the time charts in FIG. 6, the on-drum emission prohibition timer prohibits forcible emission by the main controller 61 in an area covering the photosensitive drum area. In detail, based on the output of the sensor pattern S1 of the sensor 48, forcible emission is prohibited (on-drum emission prohibition timer output: HIGH) at timing before a light beam almost reaches the photosensitive drum 4K after passing over the sensor 48 (after $T_{OFF1}$ elapses for S1 output) and the prohibition is released (on-drum emission prohibition timer output: LOW) at timing in which the light beam has passed over the photosensitive drum 4K (after $T_{OFF2}$ elapses from S1 output).

Emission with image data (including test image data) is, usually performed in a printing area on the photosensitive drum 4K. Although not disclosed in detail, the positional relationship among the light beams in the main scanning direction is not constant in the mechanism in which several light beams are combined by a half mirror for scanning, as already disclosed.

FIG. 6 illustrates that the light beam BM-Y2 is the head beam followed by the light beams BM-M2, BM-C2 and BM-K in this order. In FIG. 6, the light beams BM-M2, BM-C2 and BM-K are delayed by $\Delta Tym$, $\Delta Tyc$ and $\Delta Tyk$, respectively, from the light beam BM-Y2.

Exact matching of exposure areas by the light beams having such positional (phase) relationship requires, as shown in the figure, shifting of the light beams BM-M2, BM-C2 and BM-K by $\Delta Tym$, $\Delta Tyc$ and $\Delta Tyk$, respectively, with respect to the light beam BM-Y2 in emission timing using image data.

This exposure area setting is usually performed for each clock (one pixel) based on reference clocks. However, in the optical mechanism in this example, the light beams may be or may not be shiftied from each other by one clock, thus further finer adjustment being required. Moreover, image magnification different over light beams requires to be set as constant by deciding the reference clock frequency for each light beam.

FIG. 7 shows a circuit diagram for printing (exposure) setting per unit finer than one clock at the same image magnification, which prevents exposure of drum by forcible exposure disclosed above. In FIG. 7, the sensor output processor 50 includes a first counter 111, a second counter 112, a latch 113, and so on, for printing area control.

A synchronous circuit 550 includes four crystal oscillators 114a to 114d, selectors 115a to 115d for selecting the oscillators 114a to 114d, clock synchronous circuits 116a to 116d, delay lines 117a to 117d, four delayed clock selectors 118a to 118d, four image transfer clock generators (printing area setting sections) 119a to 119d, a sampling timer 120, an OR gate 121, an on-drum emission prohibition timer 122, and so on.

Figure 9A:
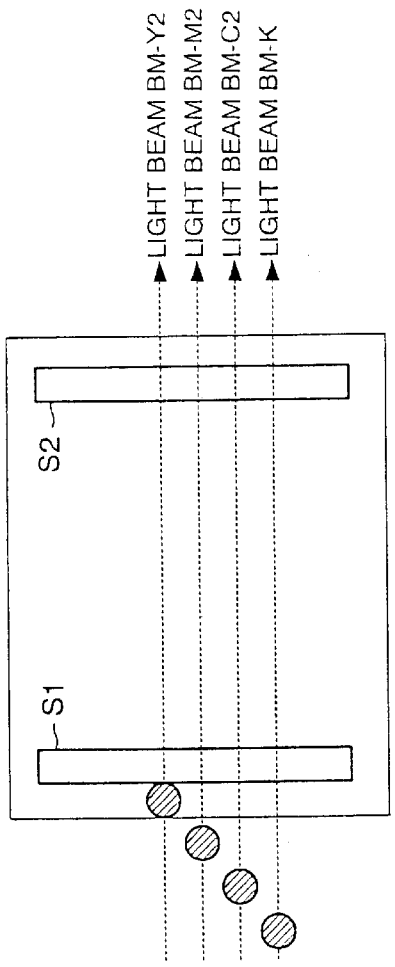
FIG. 9A is plan view illustrating the relationship between the first and the second light beam position detection sections and several light beams.
Figure 9B:
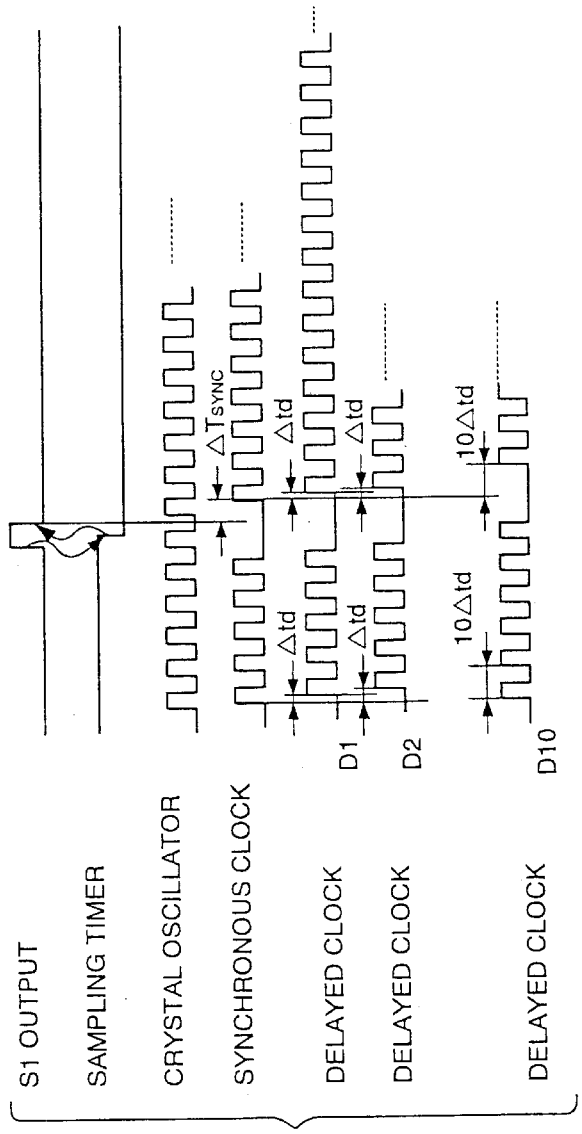
FIG. 9B is a time chart of signals corresponding to the beam positional relationship in FIG. 9A.

Disclosed below is the mechanism of printing (exposure) area setting per unit finer than one clock. As already disclosed, the sensor pattern S1 of the sensor 48 is exposed to any one (or more) of the light beams BM-Y2, BM-M2, BM-C2 and BM-K which is being forcible emitted by the sampling timer 120, thus the output signal of the sensor pattern S1 being switched from "LOW" to "HIGH", as shown in FIGS. 9A and 9B. This signal is supplied to the sampling timer 120 as disclosed to release the lasers LD-Y, LD-M, LD-C and LD-K from forcible emission.

The light beams BM-Y2, BM-M2, BM-C2 and BM-K are then turned off, thus the output of the sensor pattern S1 becoming a pulse (a pulse may be obtained by passing of the head light beam when the sampling timer 120 exhibits a slow response). The sensor pattern S1 output is also supplied to the clock synchronous circuits 116a to 116d in the synchronous circuit 550. The clock synchronous circuits 116a to 116d output clocks, as shown in 9B, at a frequency the same as the output clocks of the crystal oscillator in synchronism with the output of the sensor pattern S1. As shown, the output synchronous clocks start to rise but is delayed by $\Delta T_{SYCN}$ from the falling edge of the output of the sensor pattern S1. Therefore, the clock synchronous circuits 116a to 116d generate the same synchronous clocks when the selectors 115a to 115d select the output of the same crystal oscillator.

Disclosed below is based on the assumption that the selectors 115a to 115d select the output of the same crystal oscillator.

The synchronous clocks are supplied to the delay lines 117a to 117d for delaying the input signal by a predetermined period. The shown delay lines 117a to 117d have ten output taps. In response to the input synchronous clocks, a delayed clock D1 output from the first tap is delayed by $\Delta td$ and a delayed clock D2 output from the second tap is further delayed by another $\Delta td$.

A delayed clock D10 output from the last (tenth) tap is delayed by 10 $\Delta td$ from the input synchronous clocks. In this example, 1/10 of one cycle of the synchronous clocks is almost equal to $\Delta td$. In other words, the delayed clock D10 is almost equal to the input synchronous clocks in phase and shifted one clock from the input synchronous clocks. A delay amount of the delay lines 117a to 117d are set at 1/10 of one clock in this embodiment, however, it can be smaller for each tap while increasing the number of taps.

The output of the delay lines 117a to 117d, or the delayed clocks D1 to D10 are supplied to the delayed clock selectors 118a to 118d corresponding to the light beams BM-Y2, BM-M2, BM-C2 and BM-K. The delayed clock selectors 118a to 118d select clocks which are to be supplied to the next stage image transfer clock generator (printing area setting section) 119a to 119d based on a delayed signal selection signal output from the main controller 61. In other words, the main controller 61 can freely select clocks for printing area setting from among the delayed clocks D1 to D10 for each of the light beams BM-Y2, BM-M2, BM-C2 and BM-K.

The delayed clocks output by the delay lines 117a to 117d are actually independent from each other, or each delay line outputs delayed clocks D1 to D10 in actual application. The delayed clocks are, however, treated as the same for the delay lines have based on the assumption that the same crystal oscillator has been selected.

Disclosed next is the image transfer clock generators (printing area setting sections) 119a to 119d. The main controller 61 sets a printing area for each of the light beams BM-Y2, BM-M2, BM-C2 and BM-K per one clock (one pixel), using a printing area setting signal, thus enabling setting of output timing of image transfer clocks and the number of outputs. They are set in usual image formation so that an emission area for each of the light beams BM-Y2, BM-M2, BM-C2 and BM-K is located on a certain position on the photosensitive drum 4K. The certain position depends on paper size, margin setting, etc.

The image transfer clocks (printing area signal) obtained as above are sent to an image I/F which then outputs image data (a laser-modulation signal) corresponding to each of the light beams BM-Y2, BM-M2, BM-C2 and BM-K in synchronism with the image transfer clocks (laser-modulation signal). The laser drivers LDR-Y, LDR-M, LDR-C and LDR-K then modulate the lasers LD-Y, LD-M, LD-C and LD-K, respectively, by using the image data (laser-modulation signal).

Accordingly, the main controller 61 sets a printing area per one clock (one pixel) using respective printing area setting signals to the image transfer clock generators (printing area setting sections) 119a to 119d. Moreover, the main controller 61 sets a printing area per 1/10 clocks (1/10 pixels) separately to each of the light beams BM-Y2, BM-M2, BM-C2 and BM-K by using the delayed clock selection signals to the delayed clock selectors 118a to 118d.

Figure 10:
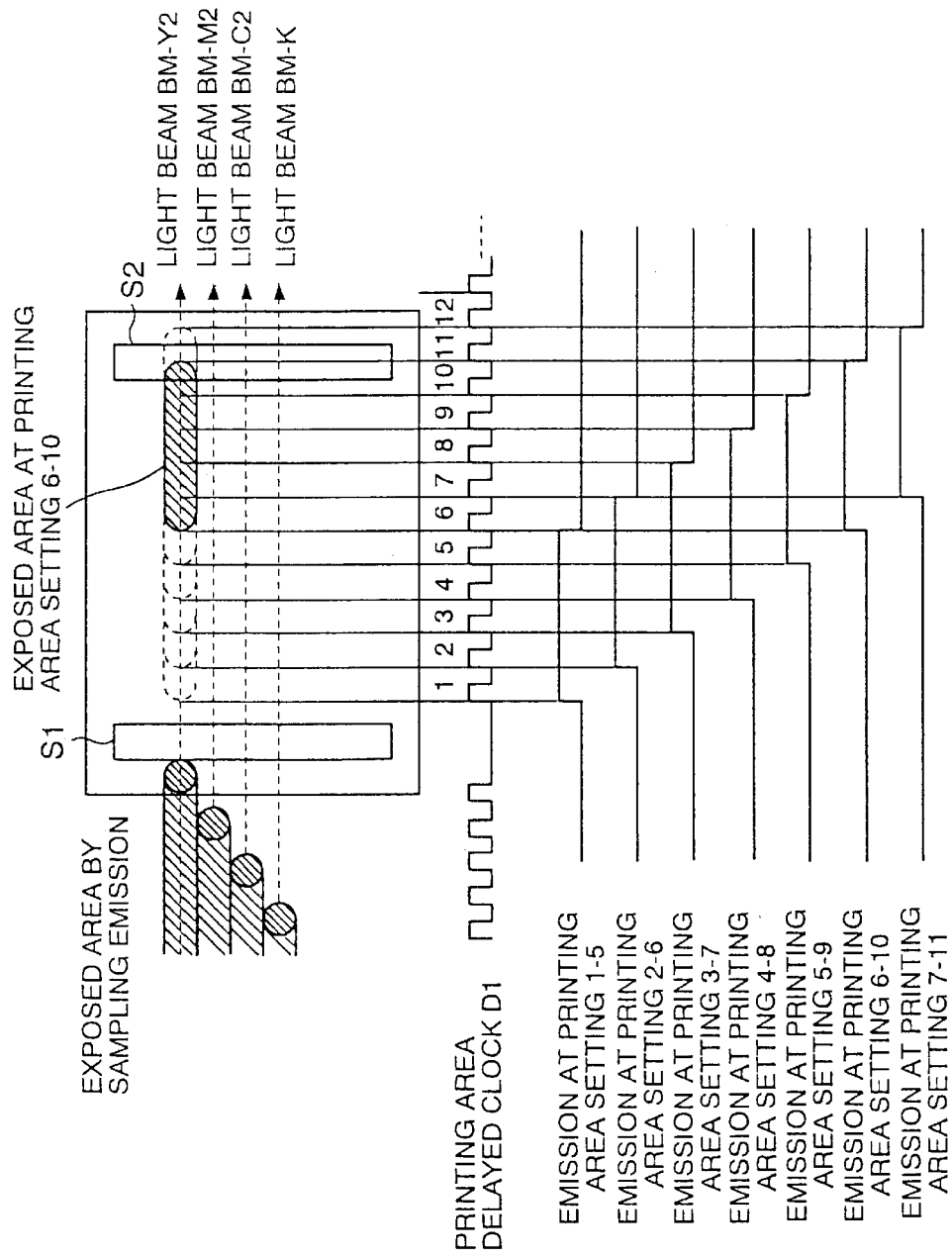
FIG. 10 is an explanatory view of printing and exposed areas corresponding to the first and the second sensors with a time chart of respective signals.

Disclosed next with reference to FIG. 10 is a principle of obtaining main scanning direction-beam position information for the light beams BM-Y2, BM-M2, BM-C2 and BM-K for obtaining a matched printing area (including image magnification) per one clock (one pixel) or 1/10 clocks (1/10 pixels).

FIG. 10 illustrates the principle in which a value set at the image transfer clock generator (printing area setting section) 119a already disclosed is extremely smaller than that for usual image formation. As shown, the main controller 61 selects a delayed clock D1, for example, for the light beam BM-Y2 and sets printing areas at "1" to "5", and then instructs all black as a test printing command to the image data I/F, thus the portions corresponding to the printing areas "1" to "5" being exposed to the light beam BM-Y2.

Accordingly, the light beam detection device 48 is exposed to the light beam which will not reach the area of the photosensitive drum 4K at a small printing area setting value such as mentioned above. Monitoring the output of the sensor pattern S2 located next to the sensor pattern S1 while the light beam detection device 48 is being exposed to the light beam as above teaches the main controller 61 that, to what size the printing area is set, the sensor patten S2 responses. The embodiment shown in FIG. 10 teaches that the sensor pattern S2 start to respond to the printing areas "1" to "10". Accordingly, the main controller 61 detects the relative positional relationship between the light beam BM-Y2 and the output of the sensor pattern S1 for each one clock (one pixel).

Figure 12:
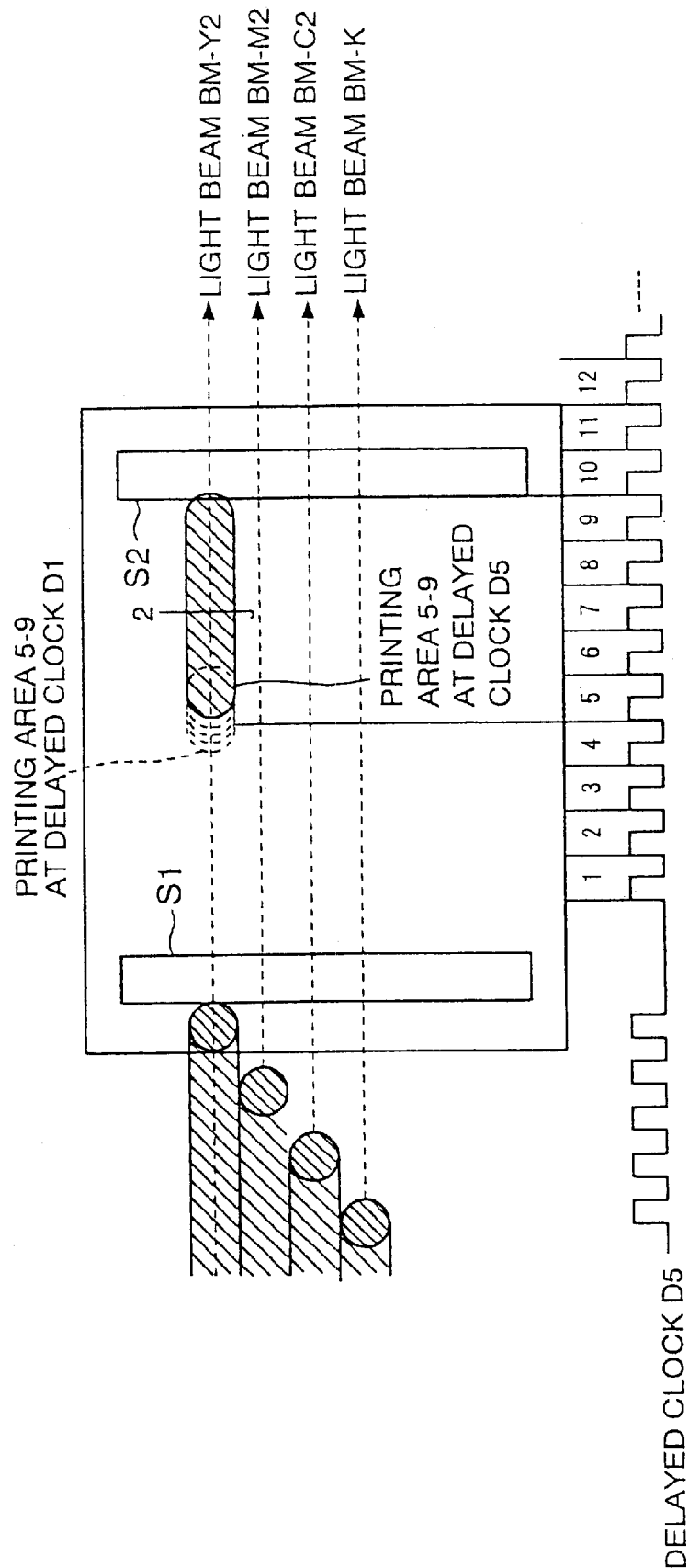
FIG. 12 is still another explanatory view of printing and exposed areas corresponding to the first and the second sensors with a time chart of respective signals.

Disclosed next with reference to FIG. 12 is detection of the relative positional relationship between the light beam BM-Y2 and the output of the sensor pattern S1 for each one clock (one pixel) or less. As described with reference to FIG. 10, the sensor pattern S2 responds to the light beam BM-Y2 at the printing areas "6" to "10" when the delayed clock D1 is selected. The main controller 61 resets the printing areas down to "5" to "9". Moreover, the controller 61 selects other delayed clocks, such as, from D1 to D2 and to D3, as shown FIG. 12. The printing area is thus shifted to the right for each 1/10 clocks (1/10 pixels). The sensor pattern S2 starts to respond when the delayed clock D5 is selected.

Accordingly, the main controller 61 determines that the sensor patten S2 is exposed to the light beam BM-Y2 at the rightmost edge of a five pixel-printing area when the delayed clock D5 is selected at the areas "5" to "9" based on the output of the sensor pattern S1. The sensor pattern S1 could be exposed again in a certain printing area, which depends on the positional relationship between the head light beam and the sensor pattern S1, thus causing the second pulse being output. This is, however, avoided by a circuit for allowing the first pulse only being output (not disclosed in detail).

The foregoing operation reveals the positional relationship between each of the light beams BM-Y2, BM-M2, BM-C2 and BM-K and the output of the sensor pattern S1 caused by the head light beam when the operation is applied to each light beam. Disclosed so far is a method of detecting main scanning-direction beam position information for each light beam, or the position with respect to the sensor pattern S2 at accuracy of 1/10 clocks (1/10 pixels). Moreover, disclosed so far is the constant light beam power over light beams as the requirements for higher accuracy. A precise detection of the positional relationship may, however, not be realized at the constant light beam power when the light beams are different in diameter or shape. The diameter or shape tend to differ for each light beam at both edges of the light beam-scanning area at which the sensors 48 and 49 are located when the lens characteristics is incomplete. Moreover, the light beam power tends to be lowered due to a bad condition of light beam incident to the polygon mirror at both edges of the light beam-scanning area.

Disclosed further is a method of accurately detecting a position of each light beam in the main scanning direction even though light beams are different in diameter or shape as discussed above.

Figure 11:
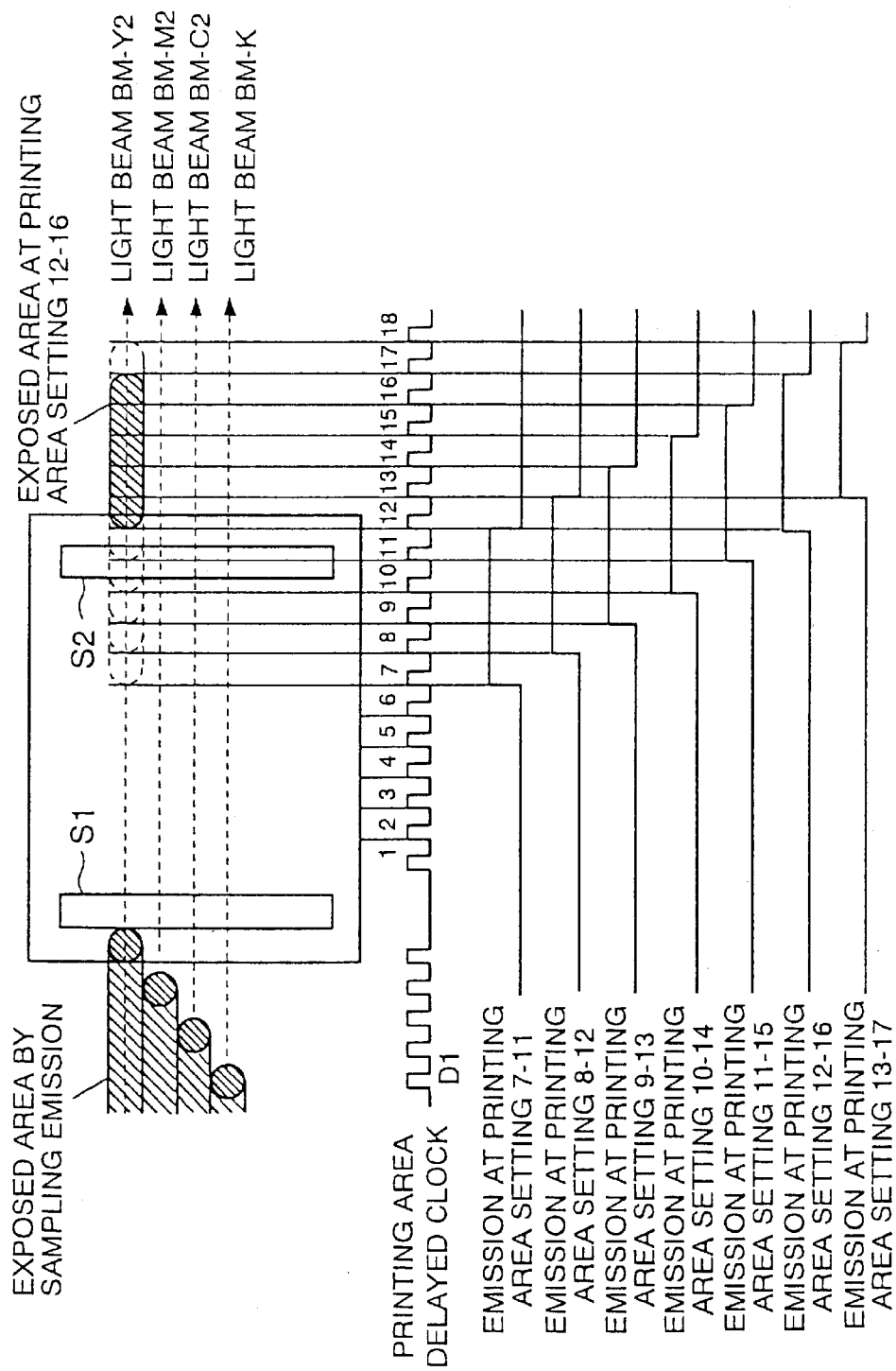
FIG. 11 is another explanatory view of printing and exposed areas corresponding to the first and the second sensors with a time chart of respective signals.

Like shown in FIG. 10, in FIG. 11, a value extremely smaller than that for usual image formation is set at the image transfer clock generator (printing area setting section) 119a. In FIG. 10, the main controller 61 detects the point at which the pattern S2 of the sensor 48 starts to respond to the light beam BM-Y2 by selecting the delayed clock D1, setting the printing areas at "1" to "5" and shifting the setting step by step. The information on the detected point serves to detect a period (positional relationship) from when the head light beam has exposed (passed) the sensor pattern S1 to when the light beam BM-Y reaches the sensor pattern S2.

Contrary to this, in FIG. 11, the printing area set at "7" to "11" is shifted to the right step by step to detect the point at which the sensor pattern S2 ceases responding. The detection operation in FIG. 10 is to detect the response of the sensor pattern S2 with respect to the right side (former edge) of the light beam BM-Y2 whereas that in FIG. 11 is to detect the response of the sensor pattern S2 with respect to the left side (latter edge) of the light beam BM-Y2. In FIG. 11, for example, the sensor pattern S2 has responded at the printing area setting from "11" to "15", however, it does not respond at the printing area setting after "12" to "16" because the printing area does not overlap (is not exposed) with the sensor pattern S2. Accordingly, the main controller 61 detects the positional relationship between the left side (latter edge) of the light beam BM-Y2 and the sensor pattern S2 for each one clock (one pixel).

Figure 13:
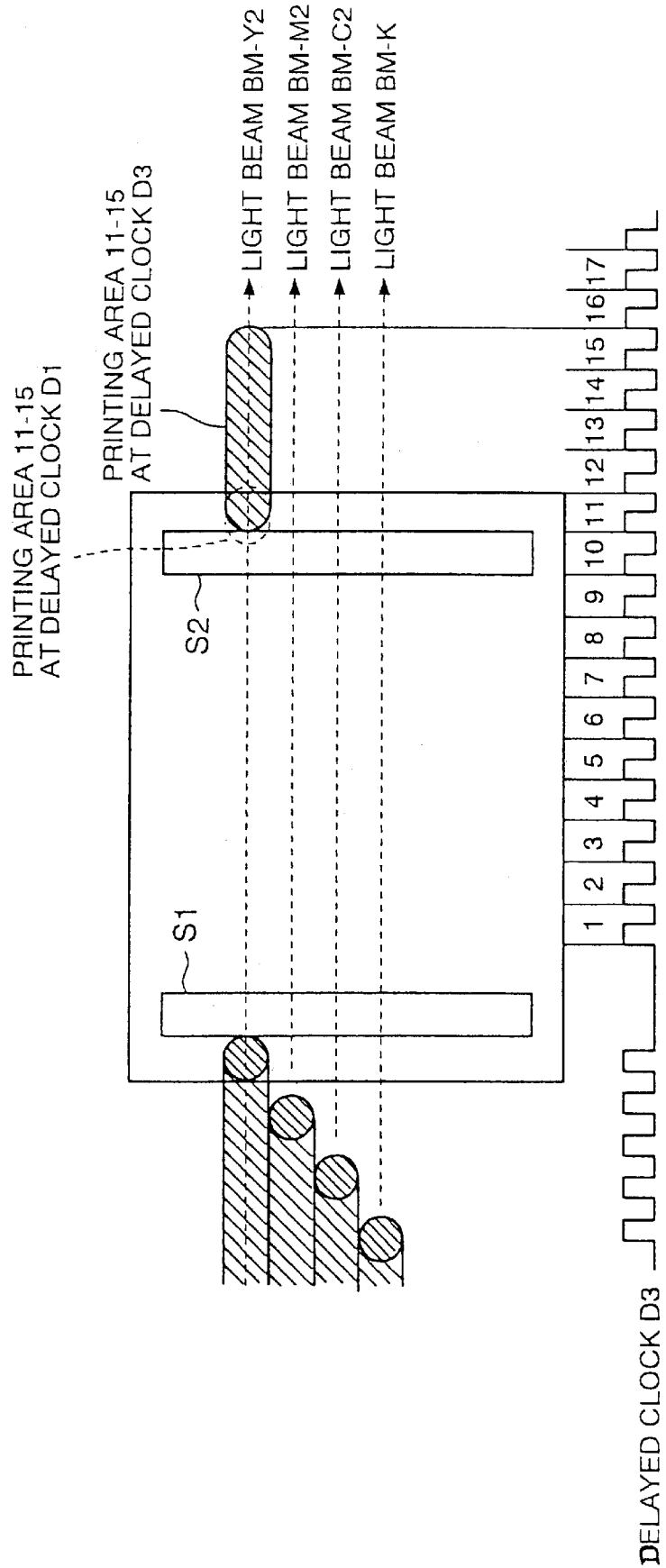
FIG. 13 is further another explanatory view of printing and exposed areas corresponding to the first and the second sensors with a time chart of respective signals.

Another disclosure is made with reference to FIG. 13. Like shown in FIG. 12, FIG. 13 illustrates a method of detection of the relationship between the left side (latter edge) of the light beam BM-Y2 and the sensor pattern S2 for each one clock (one pixel) or less. As disclosed with respect to FIG. 12, the sensor pattern S2 ceases responding to the light beam BM-Y2 at the printing area from "12" to "16" when the delayed clock D1 is selected. The main controller 61 then returns the printing area setting to "11" to "15" for switching the selection of delayed clock.

As illustrated in FIG. 13, like FIG. 12, the printing area is shifted to the right per 1/10 clocks (1/10 pixels) as the selected delayed clock is shifted from D1 to D2 and to D3. In this embodiment, the sensor pattern S2 ceases responding when the delayed clock D3 is selected.

The main controller 61 thus detects the point at which the sensor pattern S2 ceases responding at accuracy of 1/10 clocks (1/10 pixels).

Accordingly, the main controller 61 detects the positional relationship between the light beam BM-Y2 and the sensor pattern S2 based on the output of the sensor pattern S1 at accuracy of 1/10 clocks (1/10 pixels) on both right side (former edge) and left side (latter edge). Discussed below is beam diameter or beam power and the sensor pattern (S2) response.

The sensor pattern S2 starts to respond earlier at a large beam diameter or power than at a small beam diameter or power when the printing area is shifted to the right. However, when the printing area is shifted further to the right, the sensor pattern S2 ceases responding slower at a large beam diameter or power than a small beam diameter or power.

This is easily conjectured based on the fact that the sensor pattern (S2) response requires a certain amount of light incident to the sensor pattern. Care must be taken, however, that the sensor pattern S2 may not respond when a beam power is small but a beam diameter is large.

It is important here that the light beam center position can be accurately detected based on a point at which the sensor pattern S2 starts to respond and another point at which it ceases responding irrespective of the beam dimeter size and power magnitude.

As disclosed with respect to FIGS. 10, 11, 12 and 13, the light beam center position can be accurately detected based on the center of the point at which the sensor pattern S2 starts to respond and the other point at which it ceases responding irrespective of the beam dimeter size and power magnitude.

Disclosed so far is a method of accurately detecting the positional relationship between each light beam and the sensor pattern S2 of the sensor 48 irrespective of the beam dimeter size and power magnitude.

Disclosed next are a method of detecting the positional relationship between each light beam and a sensor pattern S3 of the sensor 49 and also a method of obtaining image magnification for each light beam.

As schematically illustrated in FIGS. 6 and 7, provided on the sensor 49 is the detection pattern S3 extending in the perpendicular direction with respect to the light beam scanning direction, like the sensor patterns S1 and S2 provided on the sensor 48.

The main controller 61 accurately detects the position of each light beam with respect to the sensor pattern S3 on the sensor 49, like the methods disclosed with respect to FIGS. 10, 11, 12 and 13. In other words, the position cagn be detected for each one clock (one pixel) and 1/10 clocks (1/10 pixels) based on pulse signals output by the sensor pattern S1 on the sensor 48.

Once the positions of each light beam with respect to the sensor pattern S2 on the sensor 48 and the sensor pattern S3 on the sensor 49 are detected as above, a period of time (the number of clocks) required for each light beam to scan from the sensor pattern S2 to the sensor pattern S3 is obtained. The obtained period of time (the number of clocks) provides image magnification for each light beam. A light beam that takes long (a large number of clocks) to scan from the sensor pattern S2 to the sensor pattern S3 compared to the other light beams exhibits a slow scanning speed. If such a light beam performed an exposure operation based on image data, like the other light beams, the image would shrink with respect to the light beam scanning direction. This suggests that the period of time required for a light beam to scan from the sensor pattern S2 to the sensor pattern S3 is inversely proportional to the image magnification. For example, a light beam that takes 1% more of time for scanning from S2 to S3 will produce a 1%-shrunk image whereas a light beam that takes 1% less of time for scanning from S2 to S3 will produce a 1%-stretched image.

In order to solve such a problem, this embodiment selects a clock frequency for each light beam in image formation. In detail, in FIG. 6, the selector 115a selects one of the outputs of the crystal oscillators 1 to 4 (114a to 114d) for the light beam BM-Y2, the selected output then being supplied to the clock synchronous circuit 116a. Likewise, for the light beams BM-M2, BM-C2 and BM-K, the selectors 115b, 115c and 115d select one of the outputs of the crystal oscillators 1 to 4 (114a to 114d) and supply the selected output to the clock synchronous circuits 116b, 116c and 116d, respectively.

Frequencies oscillated by the crystal oscillators 1 to 4 (114a to 114d) are different from each other by 1% for example. Therefore, at the same scanning speed for the light beams, a crystal oscillator oscillating a 1%-higher frequency provides a 1%-narrower printing area whereas a crystal oscillator oscillating a 1%-lower frequency provides a 1%-wider printing area. As disclosed, the main controller 61 is provided with the means (the selectors 115a to 115d) for selecting one of the outputs of a plurality of crystal oscillators for each light beam as the means for varying the printing area (image magnification) for each light beam. Therefore, the image magnification for each light beam is measured as already disclosed and then one of the crystal oscillators 115a to 115d is selected for each light beam by the selectors 115a to 115d so that the same image magnification is provided for the light beams, thus obtaining a uniform image magnification for all light beams as much as possible.

This embodiment is provided only four types of crystal oscillators for brevity, however, the types and the number of crystal oscillators can be increased, which are selected by the selectors 115a to 115d for higher accurate control in a wide range.

Another embodiment is, as shown in FIG. 8, provided with voltage control oscillators (VCO) for varying frequency to the corresponding light beams, to obtain an optimum frequency to each light beam.

Disclosed so far is measuring the image magnification for each light beam using the output of the sensors 48 and 49 and selecting a clock frequency used for each light beam in image formation using the measuring result, thus obtaining a uniform image magnification to all light beams.

Figure 14:
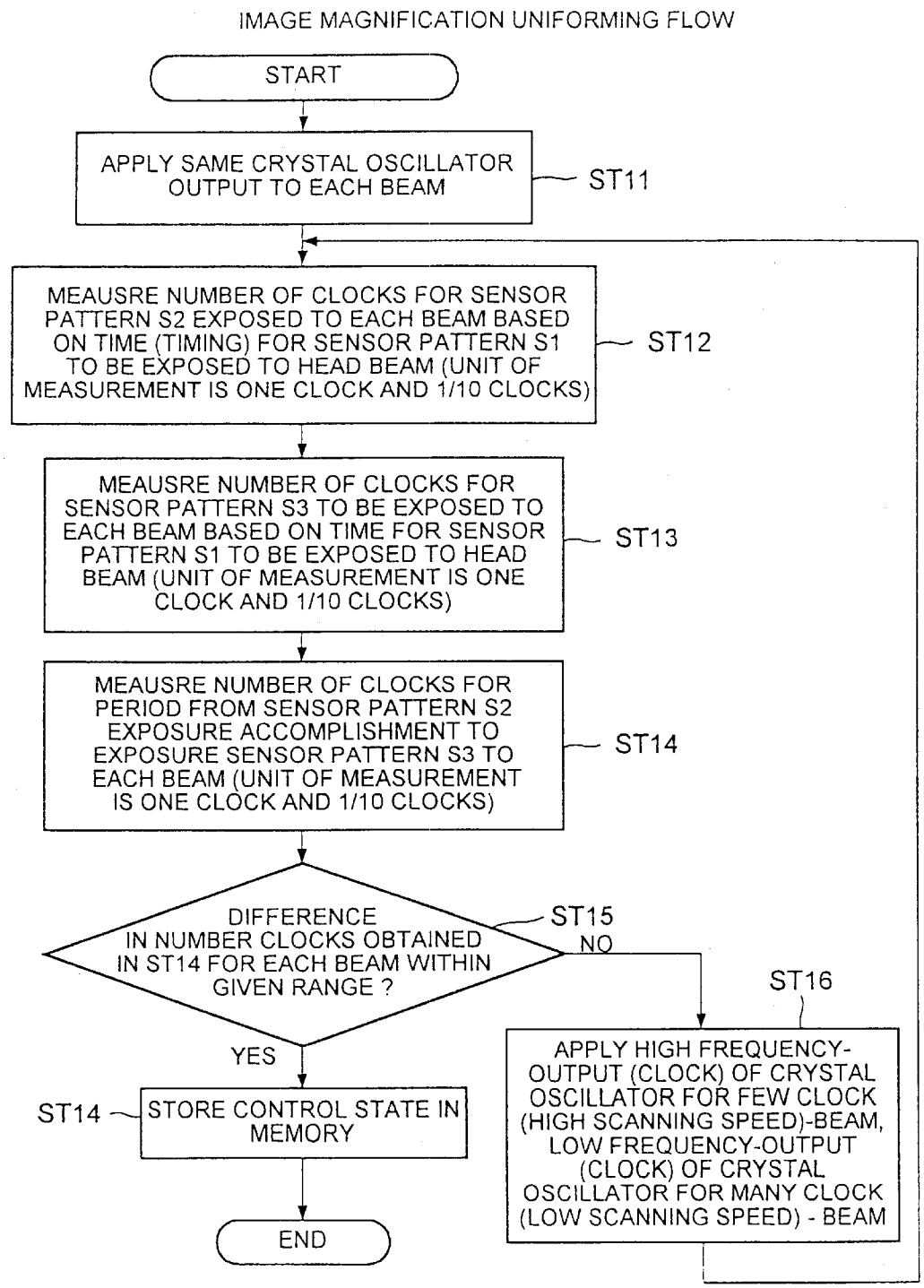
FIG. 14 is a flow chart indicating image magnification matching process.

Disclosed below with reference to FIG. 14 is a control flow for accurate matching of image magnification over the light beams BM-Y2, BM-M2, BM-C2 and BM-K with summary of the foregoing disclosure. FIG. 14 shows a process of obtaining a uniform image magnification. In step ST11, the main controller 61 applies the same crystal oscillator output (clocks) through the selectors 115a to 115d.

Next, measured in step ST12 is the number of clocks required for the sensor pattern S2 on the sensor 48 to be exposed to each light beam (over which each beam passes) based on time (timing) for the sensor pattern S1 on the sensor 48 to be exposed to the head light beam (over which the head beam passes). The unit of measurement is the number of clocks of crystal oscillator output applied to each light beam. The measurement is performed in unit of 1/10 clocks for finer than one clock. The measurement of time is, like disclosed with reference to FIGS. 10, 11, 12 and 13, to detect (measure) both the point (timing) at which the sensor pattern S2 starts to respond and the point (timing) at which it ceases responding to each light beam, thus accurately measuring time irrespective of each light beam condition.

Next, measured in step ST13 is, like step ST12, the number of clocks required for the sensor pattern S3 on the sensor 49 to be exposed to each light beam (over which each beam passes) based on time (timing) for the sensor pattern S1 on the sensor 48 to be exposed to the head light beam (over which the head beam passes). The unit of measurement is, like step ST12, the number of clocks and 1/10 clocks of crystal oscillator output applied to each light beam. Moreover, the measurement of the number of clocks is, like step ST12, to detect (measure) both the point (timing) at which the sensor pattern S3 starts to respond and the point (timing) at which it ceases responding to each light beam, thus accurately measuring time irrespective of each light beam condition in the vicinity of the sensor pattern S3 on the sensor 49.

Next, in step ST14, the main controller 61 calculates the number of clocks required for each light beam to reach from the sensor pattern S2 to the sensor pattern S3 based on the measured data from each light beam in steps ST12 and 13.

For example, for the light beam BM-Y2, in step ST12, the sensor pattern S2 starts to respond at the point (timing) when the delayed clock D5 is selected at the printing areas "5" to "9" as disclosed with respect to FIGS. 10 and 12 whereas it ceases responding at the point (timing) when the delayed clock D3 is selected at the printing areas "11" to "15" as disclosed with respect to FIGS. 11 and 13. These two information suggest that, for example, the point at which the sensor pattern S2 starts to respond based on the timing at which the sensor pattern S1 is exposed to the head light beam is 9. 5-th clock whereas the point at which it ceases responding is 11. 3-th clock. The average of these two values provides "10. 4" as the value for the sensor pattern S2 to respond to the light beam BM-Y2. In step ST13, if, for example, the point at which the sensor pattern S3 on the sensor 49 starts to respond to the light beam BM-Y2 is "7509. 7"-th clock and the point at which it ceases responding is "7511. 5"-th clock, the average of the two values provides the value "7510. 6" as the point (timing) at which the sensor pattern S3 responds. The value thus obtained provides the number of clocks for which the light beam BM-Y2 reaches the sensor pattern S3 from the sensor pattern S2. In detail, the value "10. 4" is subtracted from the value "7510. 6", to obtain the value "7500. 2". This is the value as the time (the number of clocks) required for the light beam BM-Y2 to reach the sensor pattern S3 from the sensor pattern S2. Likewise, the time (the number of clocks) required for the light beam BM-Y2 to reach the sensor pattern S3 from the sensor pattern S2 is obtained for each of the light beams BM-Y2, BM-C, BM-K.

Next, in decision step ST15, the main controller 61 compares the number of clocks required for each light beam to reach the sensor pattern S3 from the sensor pattern S2 thus obtained in step ST14 with a predetermined value, to determine whether or not the difference in the number of clocks lies in a predetermined range. The predetermined value is, for example, "7500", and if the compared result is the difference within ±0. 3 clocks, the process goes to step ST17, otherwise goes to step ST16.

The main controller performs the following process in step ST16. A high frequency-crystal oscillator output (clocks) is applied to a light beam for which the number of clocks has been determined as being smaller than the value "7499. 7" in step ST15 through the selectors 115a to 115d. On the other hand, a low frequency-crystal oscillator output (clocks) is applied to a light beam for which the number of clocks has been determined as being larger than the value "7500. 3" in step ST15 through the selectors 115a to 115d. The process means as follows: The light beam for which the number of clocks has been determined as being smaller in step ST15 is a light beam that has reached the sensor pattern S3 from the sensor pattern S2 for a small number of clocks (or a short time) at a high scanning speed (a moving speed of light beam) with respect to a selected crystal oscillator output (clocks). Image formation with this light beam will generate an image stretching in the beam scanning direction (at a large image magnification). A high frequency crystal oscillator output (clocks) applied to such a light beam offers a high image data transfer rate, so that the image will shrink in the beam scanning direction, thus adjusting the extension of image.

Contrary to this, the light beam for which the number of clocks has been determined as being larger in step ST15 is a light beam that, in step ST16, has reached the sensor pattern S3 from the sensor pattern S2 for a large number of clocks (or a long time) at a low scanning speed (a moving speed of light beam) with respect to a selected crystal oscillator output (clocks). Image formation with this light beam will generate an image shrinking in the beam scanning direction (at a small image magnification). A low frequency crystal oscillator output (clocks) applied to such a light beam as disclosed offers a low image data transfer rate, so that the image will stretch in the beam scanning direction, thus adjusting the shrinkage of image.

The crystal oscillator output (clocks) to be applied is switched and the process goes back to step ST12 to again measure the number of clocks for which a light beam reaches to the sensor pattern S3 from the sensor pattern S2 with comparison to the predetermined value. The process is repeated until the measuring result lies in the predetermined range.

When the number of clocks for which a light beam reaches the sensor pattern S3 from the sensor pattern S2 is determined as lying in the predetermined range in step ST15, the light beam exhibits image magnification within a certain accuracy, for example, ±0. 3 pixels to 7500 pixels in this embodiment. This embodiment records images at resolution of 600 dpi, thus providing images of the size (image magnification) at accuracy of ±(25. 4/600)×(0.3 ±0.0127 mm=±12. 7 $\mu$m to (25. 4/600)×=7500=317.5 mm. Disclosed so far is with respect to FIG. 7, however, not only that, crystal oscillator-frequency switching for each light beam like disclosed with respect to FIG. 8 attains the same the advantages.

Accordingly, the main controller 61 obtains the matched image magnification and further matches image recording (printing) areas for the light beams.

A method (process) of matching printing areas in an early stage in the scanning direction is disclosed in Japanese Un-examined Patent Publication No. 11-202229 (Japanese Patent Application No. 10-6776), thus being not disclosed here. Discussed below is several points to be improved on the method of matching printing areas disclosed in Japanese Un-examined Patent Publication No. 11-202229.

Figure 15A:
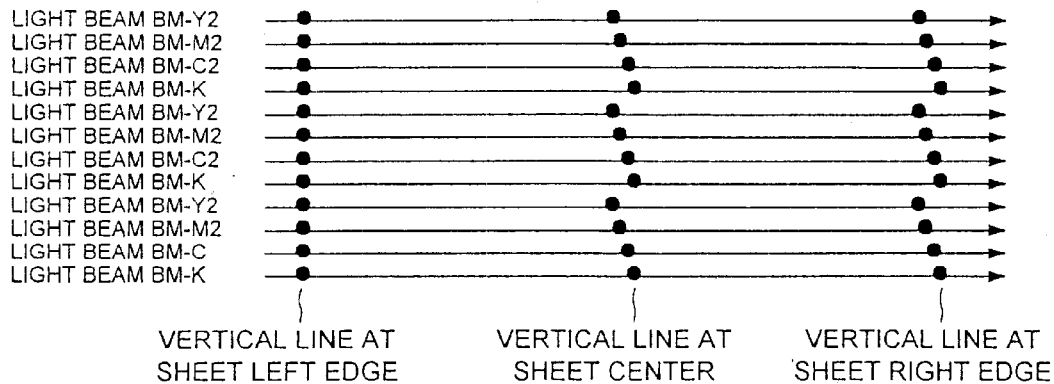
FIG. 15A is a schematic view indicating a process of matching printing areas in early stage in the scanning direction.
Figure 15B:
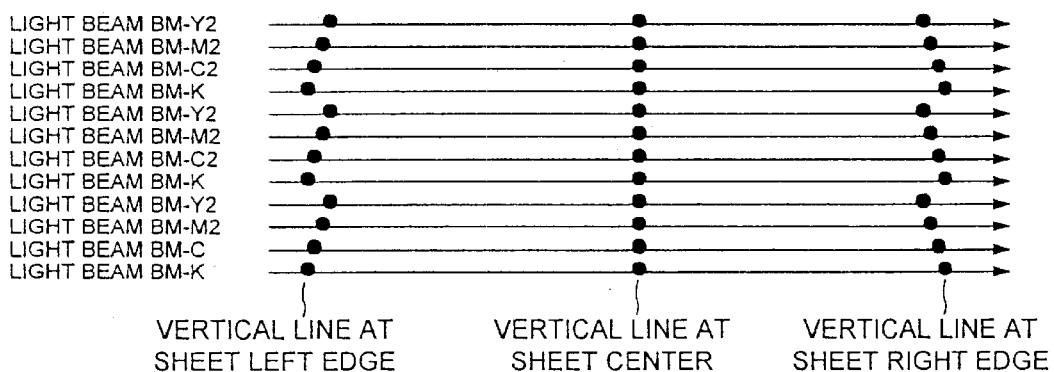
FIG. 15B is a schematic view indicating a process of making small the maximum value of shifting by making small the shifting of the sheet center.

Image-forming area matching in an early stage in the scanning direction with incomplete image magnification matching for light beams will cause shifting of image-forming area in a later stage in the scanning direction (sheet right edge in this embodiment), as illustrated in FIG. 15A. In order to mask this phenomenon as much as possible, it is preferable to distribute image-forming area shifting to right and left, as illustrated in FIG. 15B. The shifting of image-forming area for each light beam is the same as in FIG. 15A, however, a small shifting on the sheet center makes small the maximum shifting. This is achieved by checking the image magnification for each light beam in accordance with the process as disclosed above and, for incompletely matched image magnification, the image forming area is defined for each light beam so that the shifting is distributed to right and left.

Figure 15C:
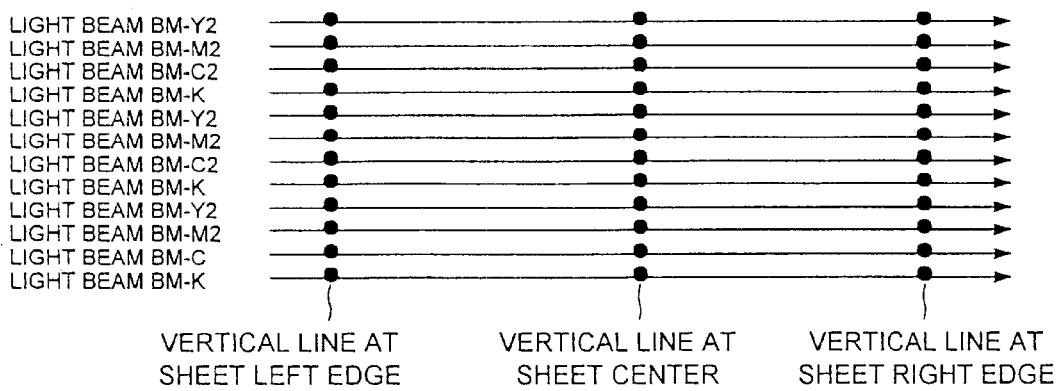
FIG. 15C is a schematic view indicating a process of canceling the shifting in the sheet center with image magnification matching.

This method is effective to minimize the shifting even if the image forming areas for light beams do not match each other. FIG. 15C illustrates an image for which shifting has been canceled on the sheet center with image magnification matching.

Discussed next is inclination of attached sensors. Images illustrated in FIGS. 16A and 16B are degraded sample images caused by inclined sensors 48 and 49 with respect to the scanning direction.

Figure 16A:
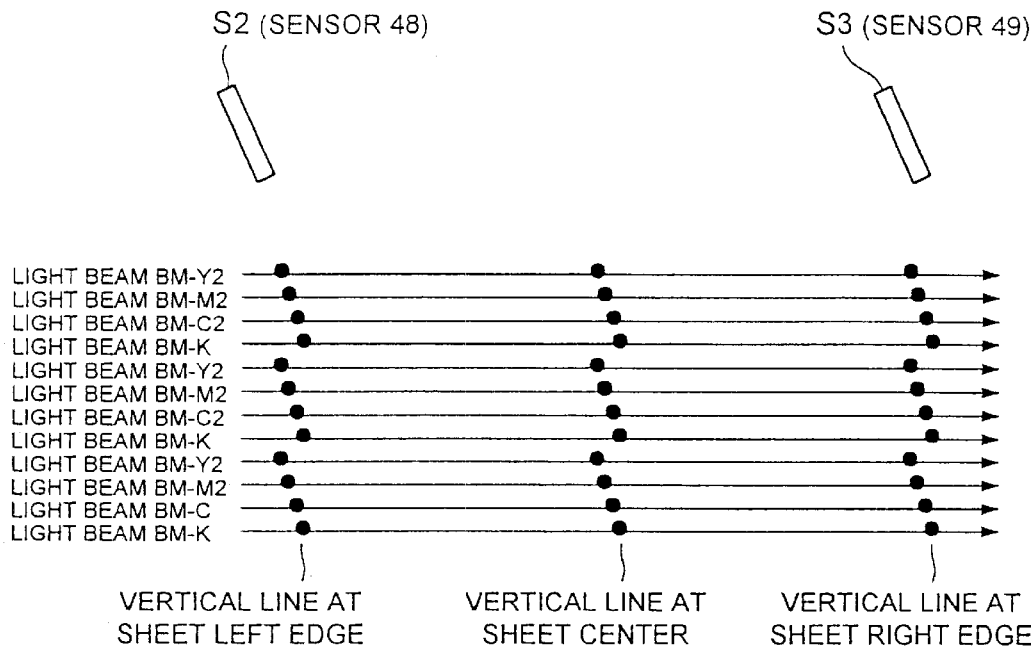
FIG. 16A is a schematic view of a degraded sample image formed when the sensors 48 and 49 are attached in the same direction with respect to the light beam scanning direction.

FIG. 16A illustrates an image of vertical lines when the sensors 48 and 49 have been inclined in the same direction. The image forming starting and finishing points are set in accordance with the sensor patterns S2 and S3 on the sensors 48 and 49, respectively, thus forming vertical (zigzag) lines inclined like the sensors.

Figure 16B:
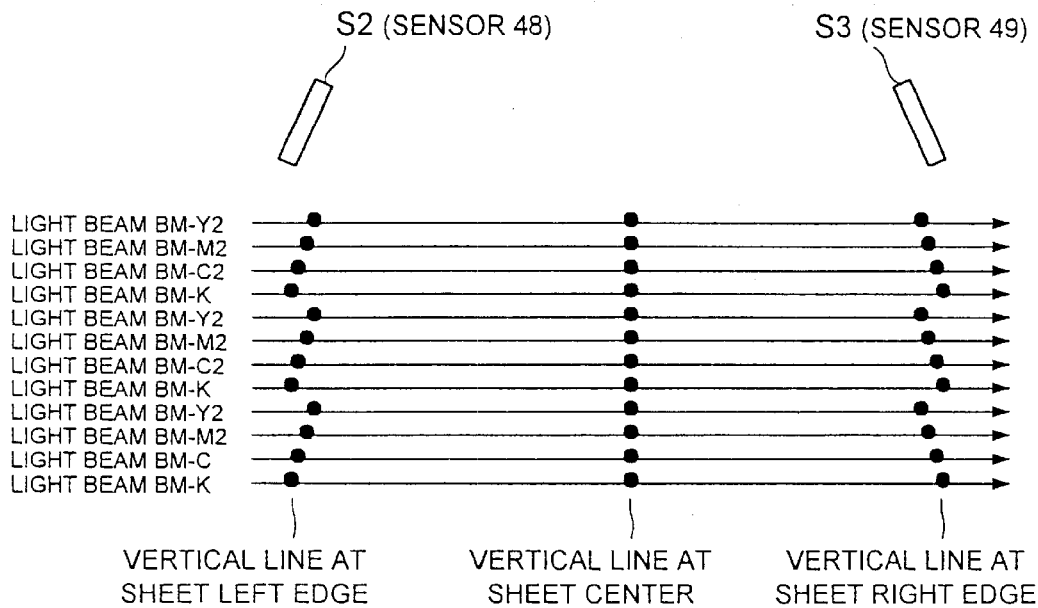
FIG. 16B is another schematic view of a degraded sample image formed when the sensors 48 and 49 are attached in different directions with respect to the light beam scanning direction.

FIG. 16B illustrates an image of vertical lines when the sensors 48 and 49 have been inclined in different direction. Image magnification and printing area are set in accordance with the sensor patterns S2 and S3 on the sensors 48 and 49, respectively, thus forming vertical (zigzag) lines inclined in the opposite directions in right and left, as illustrated in FIG. 16B, even though under exact control.

The sensor patterns S2 and S3 on the sensors 48a and 49, respectively, require to be set so that light beams pass thereover vertically to avoid such problems. This is realized by a mechanism of checking whether or not the sensors 48 and 49 are inclined to the beam scanning.

Figure 17A:
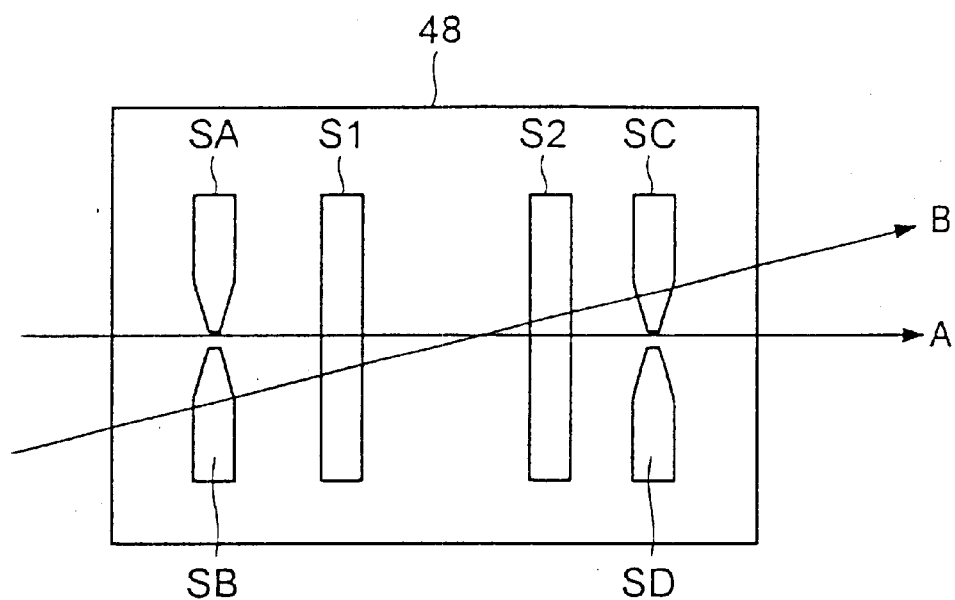
FIG. 17A is a schematic view of sensor pattern for detecting inclination of the sensor 48.
Figure 17B:
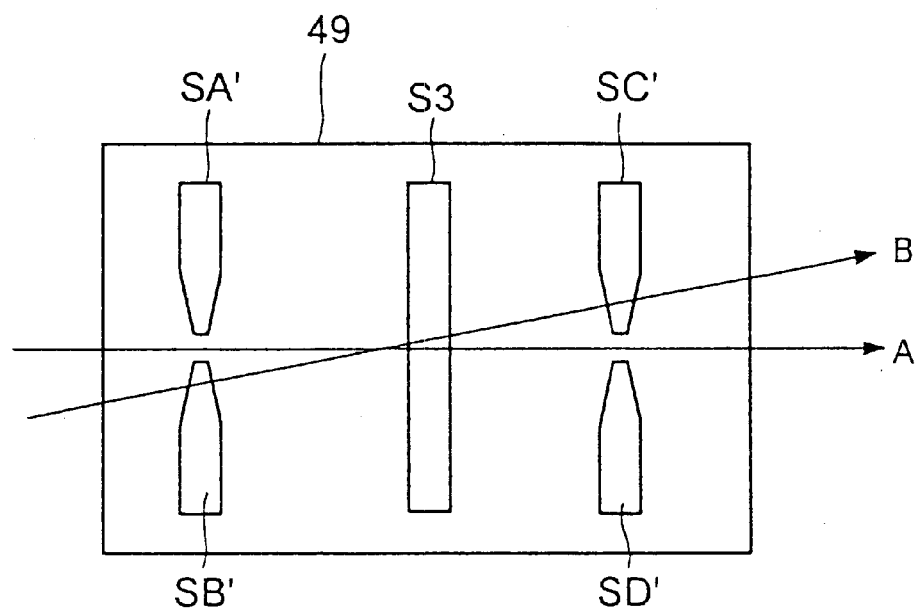
FIG. 17B is another schematic view of sensor pattern for detecting inclination of the sensor 49.

For example, as illustrated in FIG. 17A, the sensor 48 is provided with sensor patterns SA, SB, SC and SD, and, as illustrated in FIG. 17B, and the sensor 49 is provided with sensor patterns SA', SB', SC' and SD' for checking whether or not the sensors are inclined to the beam scanning.

When a light beam scans an straight-line arrow A, the difference in sensor pattern is in balance, that is, (SA–SB)= (SC–SD), thus the sensor having been not inclined. On the other hand, when a light beam scans an straight-line arrow B, the difference in sensor pattern is out of balance, that is, (SA–SB)≠(SC–SD), thus the sensor having been inclined.

Also, as illustrated in FIG. 17B for the sensor 49, when a light beam scans an straight-line arrow A, the difference in sensor pattern is in balance, that is, (SA'–SB')=(SC'–SD'), thus the sensor having not been inclined. On the other hand, when a light beam scans an straight-line arrow B, the difference in sensor pattern is out of balance, that is, (SA'–SB')≠(SC'–SD'), thus the sensor having been inclined.

As disclosed, the sensor patterns for detecting the inclination of the sensors 48 and 49 to the beam scanning offers inclination adjustment to the sensors 48 and 49 while checking the output of the sensors 48 and 49, which is combined with the sequential control described above for forming further accurate images.

Figure 18:
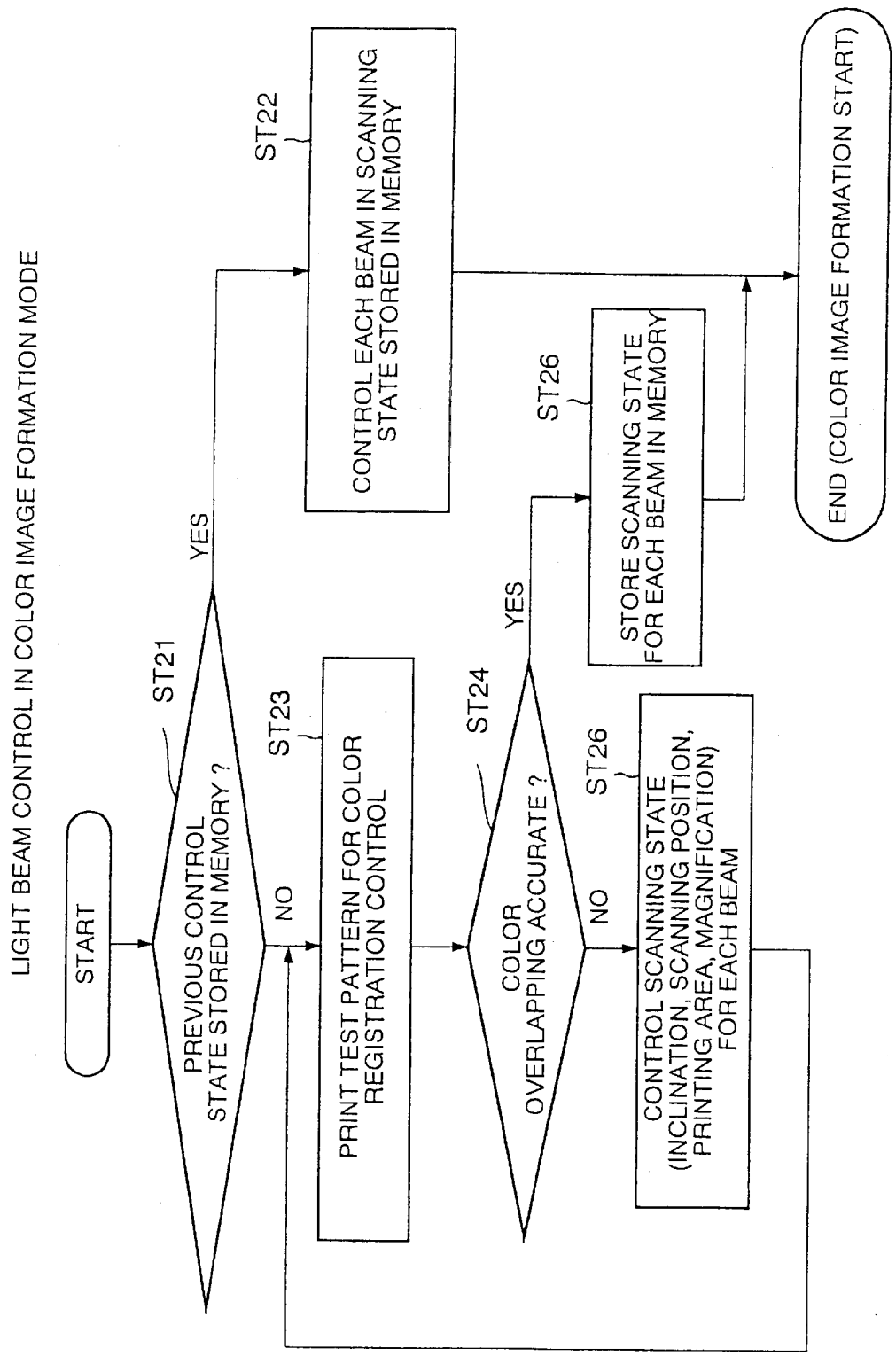
FIG. 18 is a flow chart indicating a process flow of light beam control in color image formation mode.

Disclosed lastly with reference to FIG. 18 is a process flow of a beam control operation in color image formation mode. Determined in step ST21 is whether or not the previous process result has been stored in memory. If so, in step ST22, each light beam is controlled in scanning state stored in memory, and the color image formation starts immediately.

If the previous process result is not stored in memory in step ST21, the process goes to step ST23, to print a test pattern for color registration control. Next, determined in step ST24 is whether or not color overlapping is accurate. If so, the process goes to step ST25 to store the scanning state for each light beam and ends. This initiates color image formation.

On the other hand, if color overlapping is not accurate in step ST24, the process goes to step ST26 to control scanning state of each light beam, such as, inclination, scanning position, printing area and magnification. The process then returns to step ST23 to print the test pattern, and then make decision in step ST24. When color overlapping is determined as accurate, the process ends the control operation via step ST25.

As disclosed, when the previous control state has not been stored in memory, color registration control is performed to store in memory the scanning state for each light beam in which color overlapping has been accurate.

Thereafter, each light beam is controlled in the scanning state stored in memory in color image formation mode, thus requiring no toner consumption which is required in general for test pattern formation.

What is claimed is:

1. An image forming apparatus for selectively outputting color and monochrome images comprising:
   a first light beam generator to generate a first light beam;
   a second light beam generator to generate a second light beam;
   a scanner to control the first and second light beams generated by the first and second beam generators, respectively, for scanning;
   a first scanning state changer to change a scanning state of the first light beam;
   a second scanning state changer to change a scanning state of the second light beam;
   a first member to be exposed, scanned with the first light beam or both the first and second light beams while the first member transferring in a perpendicular direction with respect to a beam scanning direction;
   a second member to be exposed, scanned with the second light beam while the second member transferring in a perpendicular direction with respect to a beam scanning direction;
   a first mode image generator to scan the first member to be exposed with the first and second light beams, thus generating a monochrome image in a first image formation mode;
   a second mode image generator to scan the first member to be exposed with the first light beam and scan the second member to be exposed with the first light beam and scan the second member to be exposed with second light beam, thus generating a color image in a second image formation mode;
   a first light beam detector to detect the scanning state of the first beam or the first and second light beams to the first member to be exposed;
   a second light beam detector to detect the scanning state of the second light beam to the second member to be exposed;
   a selector to select either the first image formation mode or the second image formation mode; and
   a controller, in the first image formation mode, to detect the scanning state of the first and second light beams to the first member to be exposed through the first detector, thus controlling the first and second scanning state changers so that each light beam is set in a certain scanning state, in the second image formation mode, to detect the scanning state of the first light beam to the first member to be exposed through the first detector and detect the scanning state of the second light beam to the second member to be exposed through the second detector, thus controlling the first and second scanning state changers so that each light beam is set in a certain scanning state;
   wherein the first and second scanning state changers change image magnification of each light beam.

2. An image forming apparatus for selectively outputting color and monochrome images comprising:
   a first light beam generator to generate a first light beam;
   a second light beam generator to generate a second light beam;
   a scanner to control the first an second light beams generated by the first and second beam generators, respectively, for scanning;
   a first scanning state changer to change a scanning state of the first light beam;
   a second scanning state changer to change a scanning state of the second light beam;
   a first member to be exposed, scanned with the first light beam or both the first and second light beams while the first member transferring in a perpendicular direction with respect to a beam scanning direction;
   a second member to be exposed, scanned with the second light beam while the second member transferring in a perpendicular direction with respect to a beam scanning direction;
   a first mode image generator to scan the first member to be exposed with the first and second light beams, thus generating a monochrome image in a first image formation mode;

a second mode image generator to scan the second member to be exposed with the second light beam, thus generating a color image in a second image formation mode;

a first light beam detector to detect the scanning state of the first light beam or the first and second light beams to the first member to be exposed;

a second light beam detector to detect the scanning state of the second light beam to the second member to be exposed;

a selector to select either the first image formation mode or the second image formation mode; and a controller, in the first image formation mode, to detect the scanning state of the first and second light beams to the first member to be exposed through the first detector, thus controlling the first and second scanning state changers so that each light beam is set in a certain scanning state, in the second image formation mode, to detect the scanning state of the first light beam to the first member to be exposed through the first detector and detect the scanning state of the second light beam to the second member to be exposed through the second detector, thus controlling the first and second scanning state changers so that each light beam is set in a certain scanning state;

wherein a transfer speed of the first member to be exposed is variable and a transfer speed in the first image formation mode is higher than another transfer speed in the second image information mode.

3. An image forming apparatus capable of switching a color image formation mode and a monochrome image formation mode and outputting a test pattern, the apparatus comprising:

a first light beam generator to generate a first light beam;

a second light beam generator to generate a second light beam;

a scanner to control the first and the second light beams generated by the first and the second light beam generators, respectively, for scanning;

a first scanning state changer to change a scanning state of the first light beam;

a second scanning state changer to change a scanning state of the second light beam;

a first member to be exposed, to form a first latent image by scanning of the first light beam and to transfer the first latent image in a perpendicular direction with respect to a beam scanning direction;

a second member to be exposed, to form a second latent image by scanning of the second light beam and to transfer the second latent image in the perpendicular direction with respect to the beam scanning direction;

a first developer to develop the first latent image formed on the first member to be exposed, into a first toner image;

a second developer to develop the second latent image formed on the second member to be exposed, into a second toner image;

a transfer member to transfer the first and second toner images on a predetermined transfer sheet;

an image positional relationship detector to detect a positional relationship between the first and second toner images respectively transferred on the predetermined transfer sheet by the transfer member;

a first light beam detector to detect a scanning state of the first light beam to the first member to be exposed;

a second light beam detector to detect a scanning state of the second light beam to the second member to be exposed;

a memory to store the scanning states of the first and the second light beams; and a controller to control the first and second scanning state changers by making the image positional relationship detector detect the positional relationship between the first and second toner images, by making the first and second scanning state changers change the scanning states of the first and second light beams to obtain the predetermined positional relationship, by making the first and second light beam detectors detect the scanning states of the first and second light beams to the first and second members to be exposed when the first and second toner images have the predetermined positional relationship, and by making the memory to store a detected result of the first and second light beam detectors, thus controlling the first and second scanning state changers to cause the first and second scanning states to be the detected result stored in the memory.

4. An image forming apparatus capable of switching a color image formation mode and a monochrome image formation mode, outputting a test pattern and storing a control state in each mode, the apparatus comprising:

a first light beam generator to generate a first light beam;

a second light beam generator to generate a second light beam;

a scanner to control the first and the second light beams generated by the first and the second light beam generators, respectively, for scanning;

a first scanning state changer to change a scanning state of the first light beam;

a second scanning state changer to change a scanning state of the second light beam;

a first member to be exposed, to form a first latent image by scanning of the first light beam or both the first and the second light beams and to transfer the first latent image in a perpendicular direction with respect to a beam scanning direction;

a second member to be exposed, to form a second latent image by scanning of the second light beam and to transfer the second latent image in the perpendicular direction with respect to the beam scanning direction;

a first developer to develop the first latent image formed on the first member to be exposed, into a first toner image;

a second developer to develop the second latent image formed on the second member to be exposed, into a second toner image;

a transfer member to transfer the first and second toner images on a predetermined transfer sheet;

an image positional relationship detector to detect a positional relationship between the first and second toner images respectively transferred on the predetermined transfer sheet by the transfer member;

a first light beam detector to detect a scanning state of the first light beam to the first member to be exposed;

a second light beam detector to detect a scanning state of the second light beam to the second member to be exposed;

a first memory to store the scanning states of at least the first and the second light beams to the first member to be exposed or control states of the first and the second scanning state changers in the first image formation mode;

a memory to store the scanning states of the first and the second light beams; and a controller to control the first and second scanning state changers by making the image positional relationship detector detect the positional relationship between the first and second toner images, by making the first and second scanning state changers change the scanning states of the first and second light beams to obtain the predetermined positional relationship, by making the first and second light beam detectors detect the scanning states of the first and second light beams to the first and second members to be exposed when the first and second toner images have the predetermined positional relationship, and by making the memory to store a detected result of the first and second light beam detectors, thus controlling the first and second scanning state changers to cause the first and second scanning states to be the detected result stored in the memory in the case where an image is formed by using the first and second toner images, and controlling the first and second scanning state changers to cause the first and second light beams to be a predetermined scanning state by using the first light beam detector in the case where an image is formed by using only the first toner image.

* * * * *